US012587985B2

(12) United States Patent
Köse et al.

(10) Patent No.: US 12,587,985 B2
(45) Date of Patent: Mar. 24, 2026

(54) OPEN-LOOP DISTRIBUTED BEAMFORMING FOR MULTIPLE DESTINATIONS

(71) Applicant: TrellisWare Technologies, Inc., San Diego, CA (US)

(72) Inventors: Cenk Köse, San Diego, CA (US); Young Yoon, San Diego, CA (US); Peter James Sallaway, San Diego, CA (US); Bruce Coy, San Diego, CA (US); Scott W. Enserink, San Diego, CA (US); Andreas Polydoros, San Diego, CA (US)

(73) Assignee: TRELLISWARE TECHNOLOGIES, INC., San Diego, CA (US)

(*) Notice: Subject to any disclaimer, the term of this patent is extended or adjusted under 35 U.S.C. 154(b) by 323 days.

(21) Appl. No.: 18/289,600

(22) PCT Filed: May 6, 2022

(86) PCT No.: PCT/US2022/028180
§ 371 (c)(1),
(2) Date: Nov. 6, 2023

(87) PCT Pub. No.: WO2022/236129
PCT Pub. Date: Nov. 10, 2022

(65) Prior Publication Data
US 2024/0259235 A1     Aug. 1, 2024

Related U.S. Application Data

(60) Provisional application No. 63/185,204, filed on May 6, 2021.

(51) Int. Cl.
H04L 25/02 (2006.01)
H04W 56/00 (2009.01)
(Continued)

(52) U.S. Cl.
CPC ..... H04W 56/0015 (2013.01); H04L 25/0202 (2013.01); H04L 25/0222 (2013.01);
(Continued)

(58) Field of Classification Search
CPC ......... G01S 1/00–82; H04B 7/02–216; H04B 17/0082–409; H04J 3/02–26;
(Continued)

(56) References Cited

U.S. PATENT DOCUMENTS

| | | | |
|---|---|---|---|
| 8,675,482 B1 | 3/2014 | Lu et al. | |
| 2008/0075033 A1 | 3/2008 | Shattil | |

(Continued)

OTHER PUBLICATIONS

International Search Report and Written Opinion mailed on Aug. 9, 2022 for International Patent Application No. PCT/US2022/0281803, of TrellisWare Technologies, Inc., 19 pages.

(Continued)

*Primary Examiner* — Timothy J Weidner

(74) *Attorney, Agent, or Firm* — PERKINS COIE LLP

(57) ABSTRACT

Devices, systems and methods for collaborative wireless communication in a wireless network are described. One example method includes performing a bidirectional communication with a reference node in the source cluster, receiving, from a destination cluster comprising a second plurality of nodes, a probe generated using a phase associated with the destination cluster, estimating, based on a propagation delay of the probe, a delay parameter, generating, based on the phase associated with the destination cluster and the delay parameter, a channel estimate, and transmitting, to each of the second plurality of nodes, a common message generated using a phase value and a delay value, wherein the phase value and the delay value are
(Continued)

1700

Performing a bidirectional communication with a reference node in the source cluster — 1710

Receiving, from a destination cluster comprising a second plurality of nodes, a probe generated using a phase associated with the destination cluster — 1720

Estimating, based on a propagation delay of the probe, a delay parameter — 1730

Generating, based on the phase associated with the destination cluster and the delay parameter, a channel estimate — 1740

Transmitting, to each of the second plurality of nodes, a common message generated using a phase value and a delay value — 1750 derived based on the channel estimate, and wherein the destination cluster is remotely located from the source cluster.

20 Claims, 18 Drawing Sheets

(51) Int. Cl.
H04W 84/18 (2009.01)
H04W 88/06 (2009.01)
H04W 92/02 (2009.01)
H04W 92/18 (2009.01)

(52) U.S. Cl.
CPC ..... H04W 56/002 (2013.01); H04W 56/0025 (2013.01); H04W 56/0045 (2013.01); H04W 56/0055 (2013.01); H04W 56/007 (2013.01); H04W 84/18 (2013.01); H04W 88/06 (2013.01); H04W 92/02 (2013.01); H04W 92/18 (2013.01)

(58) Field of Classification Search
CPC .. H04J 2011/0003–002; H04L 5/00–26; H04L 25/00–4975; H04L 27/0002–389; H04W 4/30–80; H04W 16/24–32; H04W 24/02–10; H04W 28/02–0242; H04W 52/02–0296; H04W 56/00–0095; H04W 74/002–0891; H04W 84/005–22; H04W 88/005–188; H04W 92/02–24
See application file for complete search history.

(56) References Cited

U.S. PATENT DOCUMENTS

| | | | |
|---|---|---|---|
| 2008/0150514 A1 | 6/2008 | Codreanu et al. | |
| 2014/0161114 A1* | 6/2014 | Shuey | H04W 56/0015 |
| 2014/0301494 A1* | 10/2014 | Hsu | H04W 56/0015 |
| 2017/0099658 A1 | 4/2017 | Shattil | |
| 2020/0236607 A1 | 7/2020 | Zhu et al. | |
| 2021/0021311 A1* | 1/2021 | Polydoros | H04W 56/0015 |

OTHER PUBLICATIONS

Brown III et al., "Time-Slotted Round-Trip Carrier Synchronization for Distributed Beamforming," IEEE Transactions on Signal Processing, 56(11):5630-5643, 14 pages (Nov. 1, 2008).

Chang et al., "Network Time Synchronization for Large Multi-hop Sensor Networks using the Cooperative Analog-and-Digital (CNDI) Protocol," IEEE Wireless Communications and Networking Conference (WCNC) pp. 1950-1955, 6 pages (Apirl 6, 2014).

Extended European Search Report mailed Feb. 27, 2025 for Application No. 22799721.0, of TrellisWare Technologies, Inc., 19 pages.

* cited by examiner

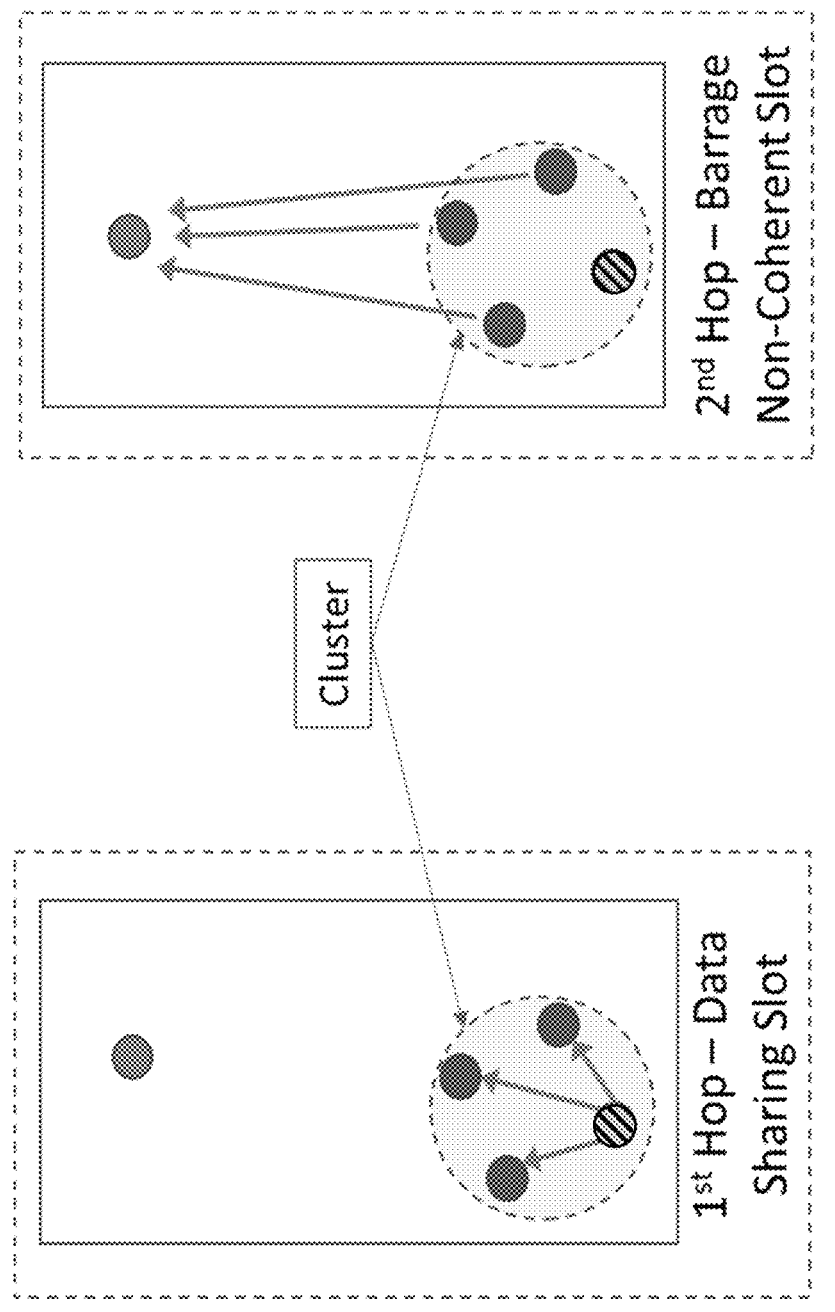
2nd Hop – Barrage Non-Coherent Slot
Cluster
1st Hop – Data Sharing Slot
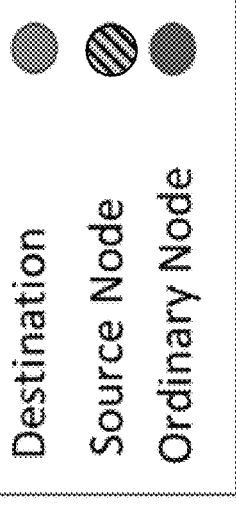
Destination
Source Node
Ordinary Node
FIG. 1

Ord. Node 1: $f_1 \rightarrow f_R$

Ord. Node $n$: $f_n \rightarrow f_R$

Ord. Node $N$: $f_N \rightarrow f_R$

Ref Node $f_R$

Start Here

Ord Node $n$ transmits a probe with $\phi_n$ in its Initiate Cal Sub-slot

Ord Node $n$ receives a probe with a Rx phase of $B_n = [\phi_0 - A_n] + \phi_{0n} - \phi_n = 2(\phi_0 - \phi_n)$ Dest. transmits a probe with $\phi_D$ in the Final Cal Sub-Slot Dest. receives the waveform with a Rx phase of $[\phi_n + B_n - C_n] + \phi_{nD} - \phi_D = 2(\phi_n - \phi_D)$ $\phi_{n0} = -2\pi f \tau_{n0}$ $\phi_{0n} = \phi_{n0}$ $\phi_{Dn} = -2\pi f \tau_{Dn}$ $\phi_{nD} = \phi_{Dn}$ Ref. Node receives a probe with a Rx phase of $A_n = \phi_n + \phi_{n0} - \phi_0$ Ref. Node transmits probe with $\phi_0 - A_n$ in the Respond Cal Sub-Slot for Ord. Node $n$ Ord. Node $n$ receives a probe with a Rx phase of $C_n = \phi_D + \phi_{Dn} - \phi_n$ Ord. Node $n$ transmits the waveform with a Tx phase of $\phi_n + B_n - C_n$ in BF Slot

FIG. 9

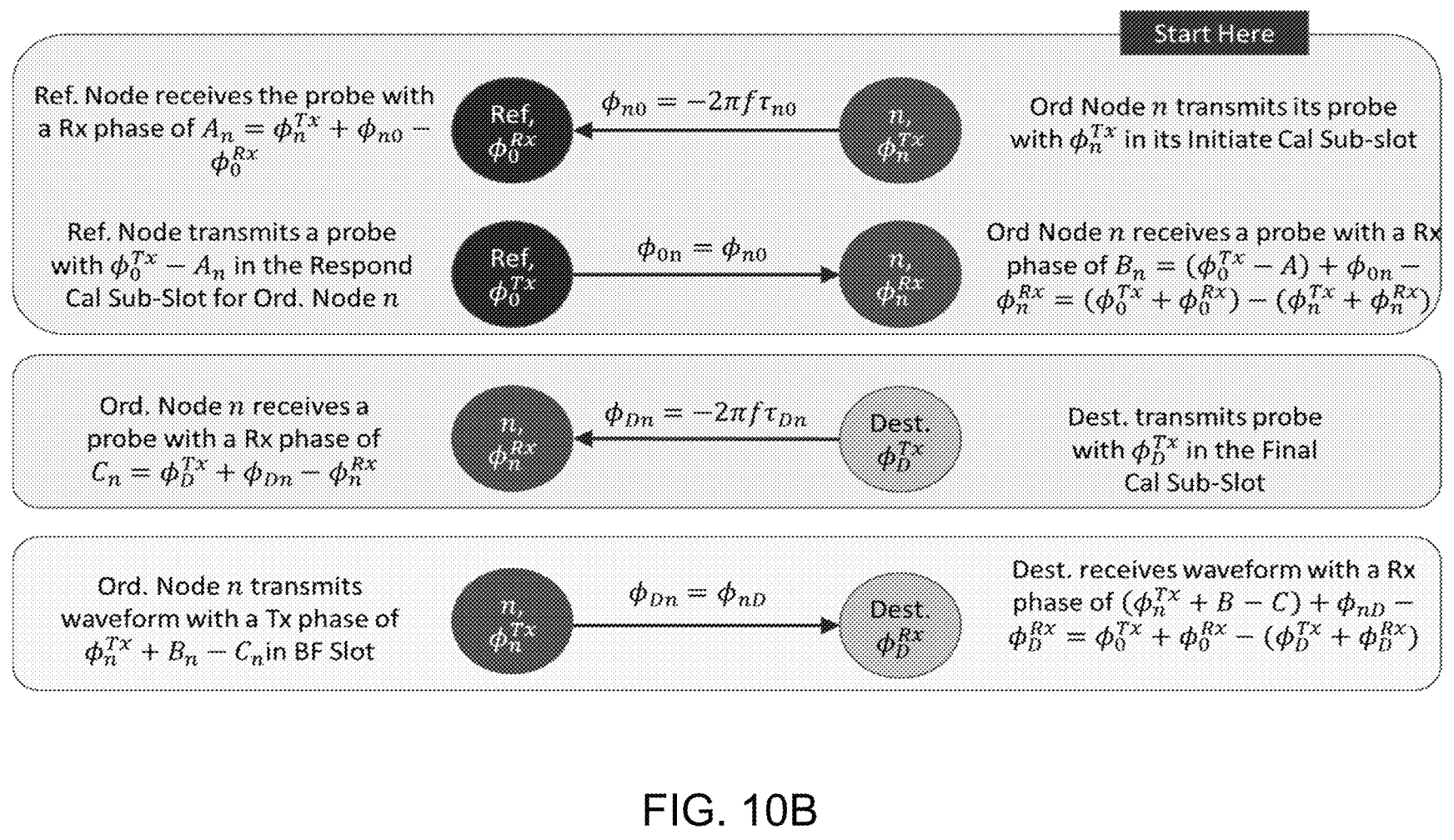

Start Here

Ord Node $n$ transmits its probe with $\phi_n^{Tx}$ in its Initiate Cal Sub-slot Ord Node $n$ receives a probe with a Rx phase of $B_n = (\phi_0^{Tx} - A) + \phi_{0n} - \phi_n^{Rx} = (\phi_0^{Tx} + \phi_0^{Rx}) - (\phi_n^{Tx} + \phi_n^{Rx})$ Dest. transmits probe with $\phi_D^{Tx}$ in the Final Cal Sub-Slot Dest. receives waveform with a Rx phase of $(\phi_n^{Tx} + B - C) + \phi_{nD} - \phi_D^{Rx} = \phi_0^{Tx} + \phi_0^{Rx} - (\phi_D^{Tx} + \phi_D^{Rx})$ $\phi_{n0} = -2\pi f \tau_{n0}$ $\phi_{0n} = \phi_{n0}$ $\phi_{Dm} = -2\pi f \tau_{Dm}$ $\phi_{Dn} = \phi_{nD}$ Ref. Node receives the probe with a Rx phase of $A_n = \phi_n^{Tx} + \phi_{n0} - \phi_0^{Rx}$ Ref. Node transmits a probe with $\phi_0^{Tx} - A_n$ in the Respond Cal Sub-Slot for Ord. Node $n$ Ord. Node $n$ receives a probe with a Rx phase of $C_n = \phi_D^{Tx} + \phi_{Dm} - \phi_n^{Rx}$ Ord. Node $n$ transmits waveform with a Tx phase of $\phi_n^{Tx} + B_n - C_n$ in BF Slot

FIG. 10B

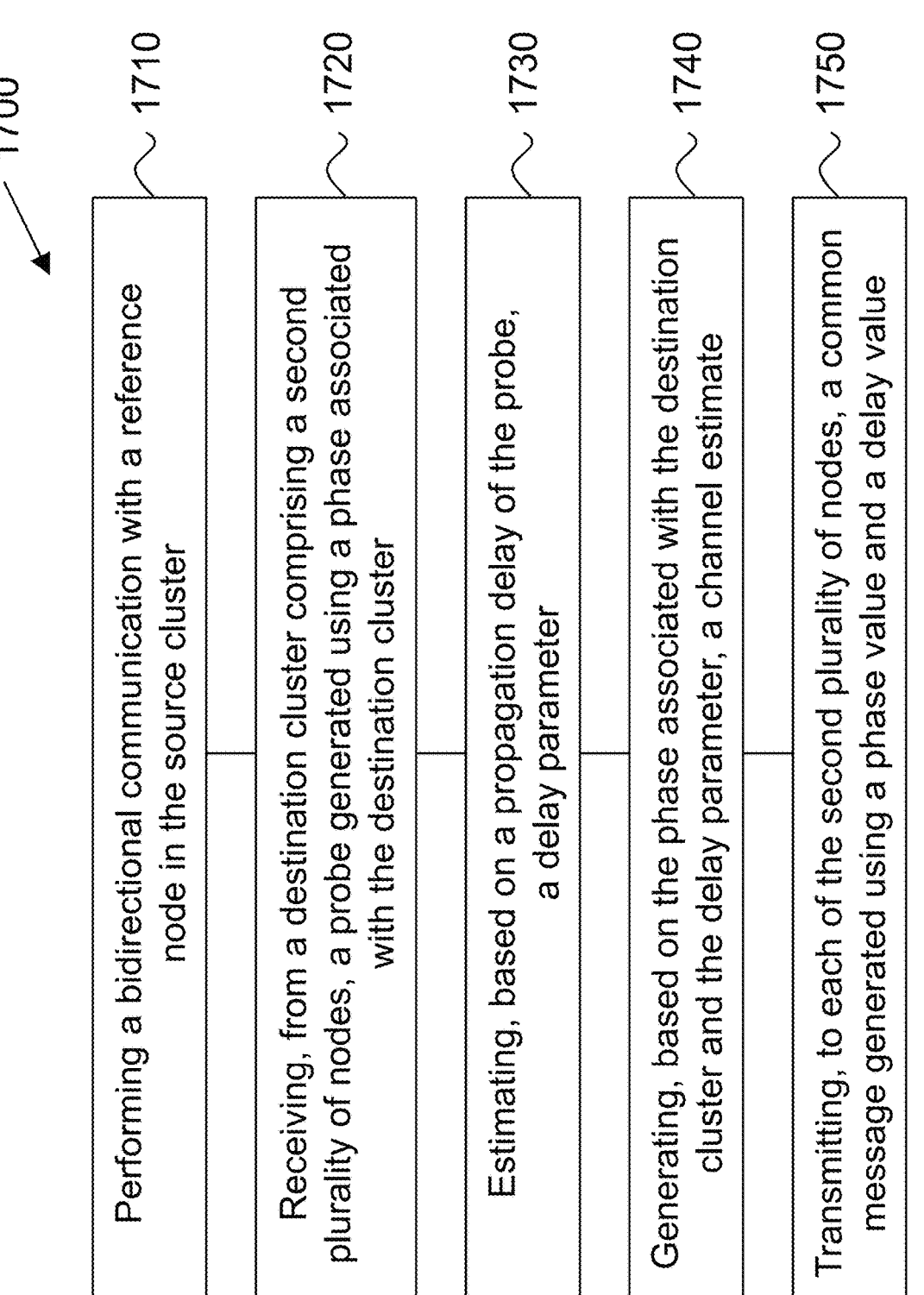

1700

1710 Performing a bidirectional communication with a reference node in the source cluster 1720 Receiving, from a destination cluster comprising a second plurality of nodes, a probe generated using a phase associated with the destination cluster 1730 Estimating, based on a propagation delay of the probe, a delay parameter 1740 Generating, based on the phase associated with the destination cluster and the delay parameter, a channel estimate 1750 Transmitting, to each of the second plurality of nodes, a common message generated using a phase value and a delay value

FIG. 17

OPEN-LOOP DISTRIBUTED BEAMFORMING FOR MULTIPLE DESTINATIONS

CROSS-REFERENCE TO RELATED APPLICATION

This application is a 371 U.S. National Stage application of International Application No. PCT/US2022/028180, filed May 6, 2022, which claims the benefit of U.S. Provisional Application No. 63/185,204, filed May 6, 2021, which are incorporated herein by reference in their entireties for all purposes.

TECHNICAL FIELD

This document is directed to collaborative wireless communications amongst nodes in a wireless network.

BACKGROUND

A mobile ad-hoc network (MANET) is a decentralized type of wireless network that includes spatially distributed power-limited radio nodes with omnidirectional antennas. The performance of a MANET can be improved using beamforming techniques, which enable a signal to be directed in some privileged directions or channels and can result in an increase in the per-link capacity of the nodes of the MANET.

SUMMARY

This document relates to methods, systems, and devices for open-loop distributed beamforming for multiple destinations. The described embodiments advantageously implement an open-loop distributed beamforming technique that requires no explicit management by the receiving side or channel state information (CSI) feedback. Compared to existing systems, the described embodiments provide, inter alia, the following advantages and benefits:

Mitigation of degradation due to residual frequency offset by using a time-domain multiple access (TDMA) medium access channel (MAC) that enables exchanging of probes of short duration;

Support for multiple destinations using open-loop beamforming calibration;

Support for frequency synchronization; and

Support for channel prediction.

In one example aspect, a method for collaborative wireless communication is disclosed. The method includes performing a bidirectional communication with a reference node in the source cluster, receiving, from a destination cluster comprising a second plurality of nodes, a probe generated using a phase associated with the destination cluster, estimating, based on a propagation delay of the probe, a delay parameter, generating, based on the phase associated with the destination cluster and the delay parameter, a channel estimate, and transmitting, to each of the second plurality of nodes, a common message generated using a phase value and a delay value, wherein the phase value and the delay value are derived based on the channel estimate, and wherein the destination cluster is remotely located from the source cluster.

In another example aspect, a system for collaborative wireless communication is disclosed. The system includes a first plurality of nodes in a source cluster, a reference node in the source cluster, and a second plurality of nodes in a destination cluster, wherein each of the first plurality of nodes is configured to perform a bidirectional communication with the reference node, receive, from the destination cluster, a probe generated using a phase associated with the destination cluster, estimate, based on a propagation delay of the probe, a delay parameter, generate, based on the phase associated with the destination cluster and the delay parameter, a channel estimate, and transmit, to each node of the second plurality of nodes, a common message generated using a phase value and a delay value, wherein the phase value and the delay value are derived based on the channel estimate, and wherein the destination cluster is remotely located from the source cluster.

In yet another example aspect, the above-described methods are embodied in the form of processor-executable code and stored in a computer-readable program medium.

In yet another example embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 1 shows an example of a two-stage distributed beamforming (DBF) process.

FIG. 9 shows an example of transmit phase calibration for DBF.

FIGS. 10A and 10B show another example of phase calibration for DBF.

FIG. 17 shows a flowchart of an example method for collaborative wireless communication, in accordance with embodiments of the disclosed technology.

DETAILED DESCRIPTION

Figure 2:
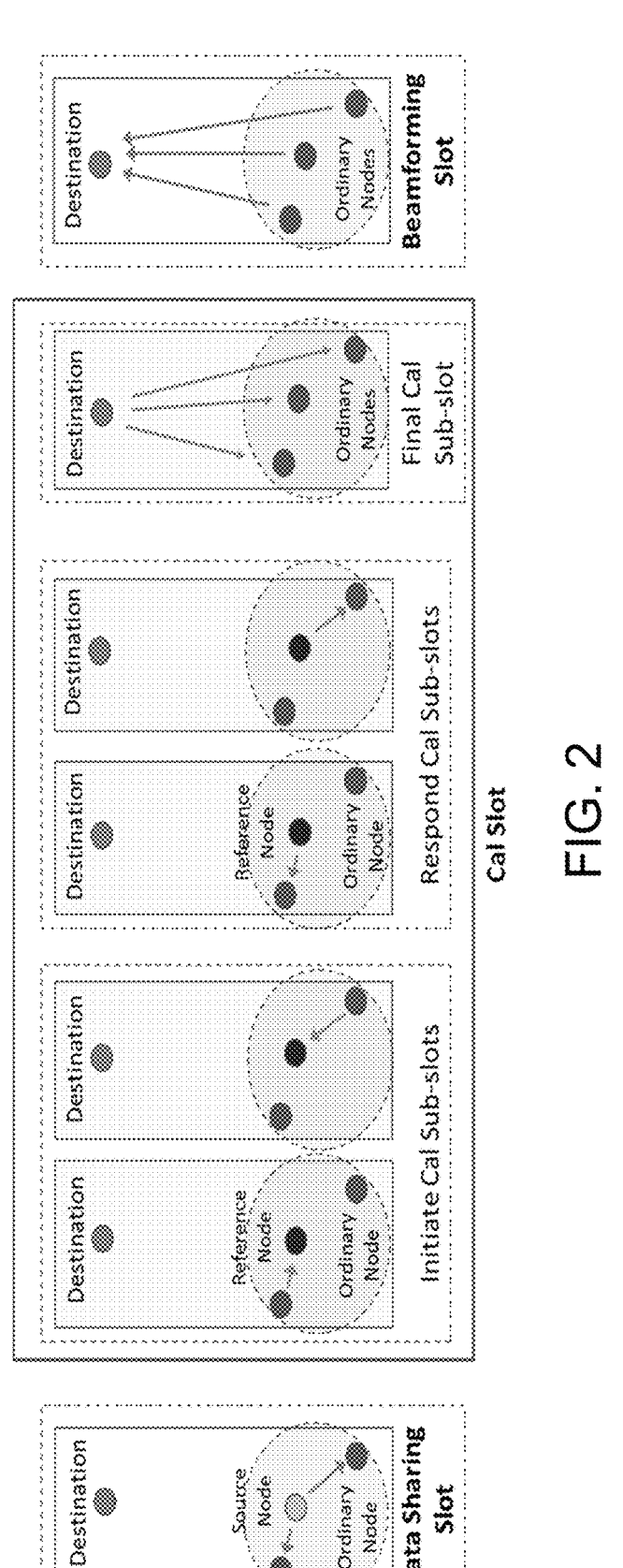
FIG. 2 shows an example of an open-loop DBF process.

A mobile ad hoc network (MANET) is a continuously self-configuring, infrastructure-less network of mobile devices connected wirelessly. A MANET typically includes spatially distributed power-limited radio nodes with omnidirectional antennas, which may be both terrestrial and non-terrestrial. In an example, the network may be dynamic (nodes are moving) and may not be fully connected (multiple hops may be needed for full network coverage). In another example, the radios may operate in multipath fading propagation environments, and may employ constant-envelope modulations for increased power efficiency.

Distributed beamforming was originally proposed to improve the data exfiltration capability of sensor networks consisting of static low-powered nodes with narrowband (low data rate) measurements. Its benefits included increased energy efficiency, and consequently, increased operational longevity.

Embodiments of the disclosed technology leverage another facet of distributed beamforming, namely range extension, i.e., the ability to relay messages collaboratively to multiple remote (or destination) nodes that are otherwise unreachable by a single local radio or even by multiple radios transmitting simultaneously in a phase-incoherent manner. The range extension benefit can also be translated to other desired attributes such as higher rates to a destination, lower required transmit power, and the like.

In order to realize the coherence gains provided by distributed beamforming, the radio frequency (RF) phases-of-arrival of individual transmissions need to align at the intended destination. In contrast to classical beamforming that relies on collocated emitters, the RF phase of transmission is different (and typically unknown or un-estimable) for each participating emitter in distributed collaborative beamforming. Therefore, a process of phase coordination (also referred to as self-coherence) is required across the radios. This process typically compensates for phase changes due to mobility, as well as RF impairments such as oscillator frequency offsets, drifts and phase noise.

As referred to herein, "distributed beamforming" may include a cluster (or group) of handheld radio (or radio nodes) self-cohering to close a communication link between the cluster and a distant radio (or radio node) referred to as the Destination (or Dest.). In some embodiments, the handheld radio nodes may be replaced by unmanned aerial vehicles (UAVs) or vehicles with radios.

As referred to herein, "open-loop" does not mean that the destination is not involved at all, i.e., "open-loop" does not mean "destination-blind". Rather, it means that phase-calibrating to the destination involves only one-way signaling from the destination to the local network ("downlink" only), as opposed to two-way signaling that also requires the local nodes to transmit to the destination, which is referred to as the closed-loop option.

Section headings are used in the present document to improve readability of the description and do not in any way limit the discussion or embodiments (and/or implementations) to the respective sections only.

1. Overview of Distributed Beamforming

FIG. 1 shows an example of a two-stage distributed beamforming (DBF) process. As shown therein, a Source Node relays a waveform (e.g., a packet of data) to other nodes, referred to as Ordinary (Ord.) Nodes, in the same cluster. This dissemination of the waveform is referred to as the 1 st Hop or the data sharing slot (the left-hand portion of FIG. 1).

In a subsequent slot, referred to as the 2nd Hop, each Ordinary Node transmits the same waveform to the Destination Node (the right-hand portion of FIG. 1). Without phase calibration among the nodes, the individual transmit phases are independent random variables and the waveforms arriving at the Destination Node combine non-coherently. Phase calibration allows the transmit phases to be shaped so that waveforms combine coherently and yield a beamforming gain. This latter scenario is referred to as DBF transmit phase shaping (or simply, phase shaping).

In some embodiments, the transmit phases can be determined to implement open-loop distributed beamforming (OL-DBF), as shown in FIG. 2. OL-DBF is characterized, inter alia, by the use of a reference node to serve as the standard to which all Ordinary Nodes tune their carrier frequency and phases to, and a Calibration Slot (Cal. Slot in FIG. 2) that is used to determine the transmit phases. As shown in FIG. 2, the Calibration Slot includes:

An Initiate Calibration sub-slot where each Ordinary Node transmits a special probe to a predetermined (pre-selected) Reference Node;

A Respond Calibration sub-slot where the Reference Node sends a return probe back to each Ordinary Node; and A Final Calibration sub-slot where the Destination Node transmits to the cluster The 2nd Hop slot from FIG. 1 is referred to as the Beamforming Slot in FIG. 2.

In some embodiments, the Reference Node can behave as an Ordinary Node in the Final Cal sub-slot and the Beamforming Slot, thereby participating in the Beamforming Slot and transmitting the waveform to the Destination Node.

In some embodiments, the Source Node and the Reference Node are the same node, whereas in other embodiments, the Source Node is different from the Reference Node. In yet other embodiments, the Source Node may be a backbone-type network node, a node in the network that is not part of the first cluster or the second cluster, or a node external to the network that has a dedicated communication link for the Data Sharing Slot.

Figure 3:
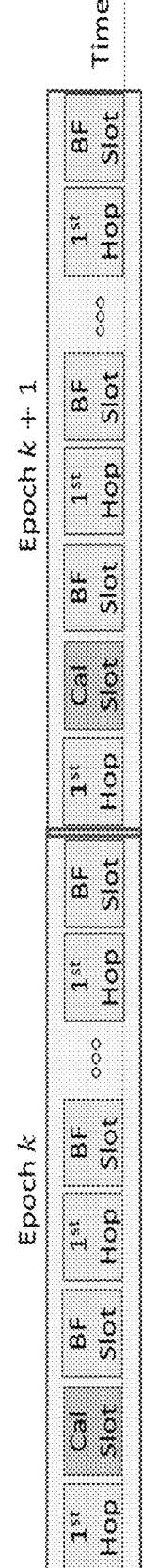
FIG. 3 shows an example of timeslots in an epoch for the open-loop DBF process.

In some embodiments, the slots from the 1st Hop just before a Calibration Slot to the final Beamforming Slot before the next Calibration Slot is referred to as an "epoch," as shown in the example in FIG. 3. As indicated by the timeslots in FIG. 3, the transmit phase settings at each Ordinary Node may be reused in many subsequent Beamforming Slots but need to be refreshed periodically with a new Calibration Slot. The Calibration Slot is placed just after the 1st Hop to maximize the freshness of the transmit phases determined during the Calibration Slot.

In some embodiments, a simplified version of the approach discussed above results in a distributed collaborative beamforming approach that is detailed in Section 8.

2. Examples of Medium Access Control (MAC) for the Calibration Slot

Figure 4:
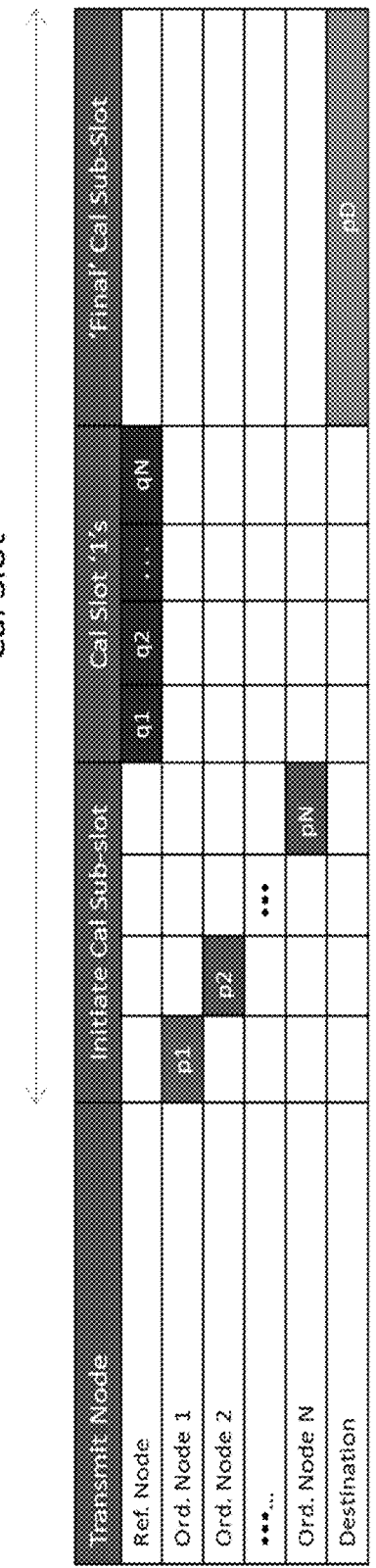
FIG. 4 shows an example of time-division multiple access (TDMA) calibration slots.

As discussed above, the Calibration Slot includes three types of sub-slots. FIG. 4 shows an example of a time-division multiple access (TDMA) Calibration Slot for N Ordinary Nodes, as configured by the MAC of the network. As shown therein, the Calibration Slot includes the following three types of sub-slots for the N Ordinary Nodes:

Initiate Calibration sub-slots in which each Ordinary Node $n \in [1. N]$ transmits its probe $p(n)$ to the Reference Node;

Respond Calibration sub-slots in which the Reference Node sends back a return probe $q(n)$ to each Ordinary Node; and A Final Calibration sub-slot in which the Destination
Node transmits a probe p(D) to the cluster (of Ordinary
Nodes and the Reference Node). In some embodiments,
the Final Calibration sub-slot may be longer than the
Initiate Calibration and Respond Calibration sub-slots
to support the possibility of distant Destination Nodes,
which in turn would require longer probes and guard
times.

Herein, an Initiate Calibration sub-slot for any Ordinary
Node must always precede the Respond Calibration sub-slot
for that Ordinary Node.

Although only transmit slots are described in the context
of FIG. 4, it is understood that FIG. 4 and the above
discussion also define which nodes should listen for a probe
and when to do so based on the above description.

In some embodiments, the Final Calibration sub-slot can
be time shifted in any sub-slot instead of the last one. For
example, the Final Calibration sub-slot can be before the
Initiate Calibration sub-slots or between the Initiate and
Final Calibration sub-slots.

Figure 5:
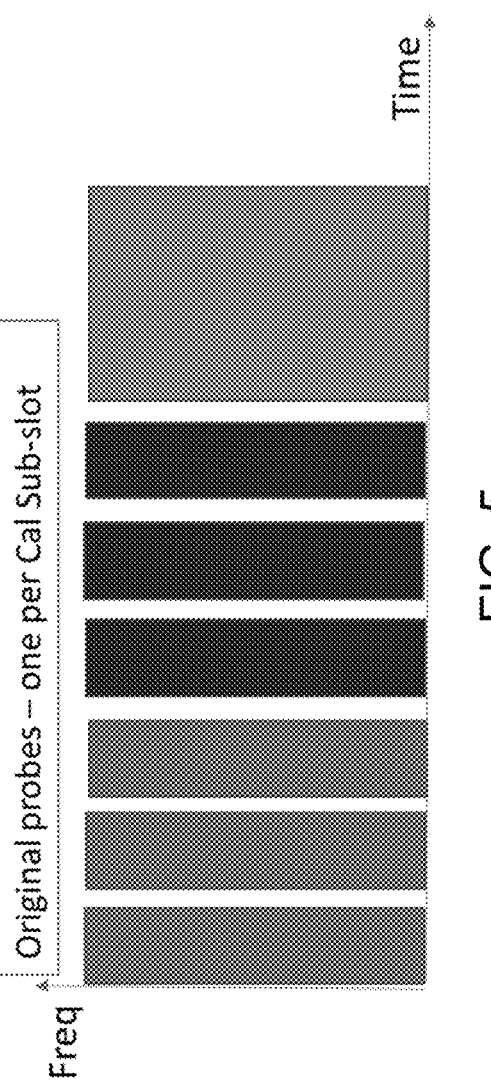
FIG. 5 shows an example of the TDMA calibration slots in the time-frequency plane.

An example of the TDMA Calibration Slot for N=3
Ordinary Nodes is shown in FIG. 5, where each sub-slot
occupies the entire available bandwidth.

In some embodiments, the example embodiments
described in FIGS. 1 and 2 are configured such that the
Ordinary Nodes (and the Reference Node) perform the DBF
(or OL-DBF) process in conjunction with a cluster of
destination nodes (instead of a single Destination Node). In
these embodiments, the Destination Node that transmits the
probe p(D) to the source cluster (of Ordinary Nodes and the
Reference Node) will be one of the nodes in the destination
cluster. In an example, the Destination Node is selected to be
the node that is closest to a center of mass of the destination
cluster because a node at the center of mass of the network
(or group of nodes) tends to be a better (more stable)
candidate for performing centralized functions that are vul-
nerable to single point of failure.

In some embodiments, the destination cluster also has a
reference node (which is needed when considering bidirec-
tional DBF) and reduces to the single destination probe (no
extra calibration steps/slots required) when there is only one
destination node (which is the reference node itself).

Embodiments that describe the distributed beamforming
process between a source cluster and a destination cluster
are further detailed in Section 7.

3. Examples of Frequency Offset Correction at Ordinary Nodes

Figure 6:
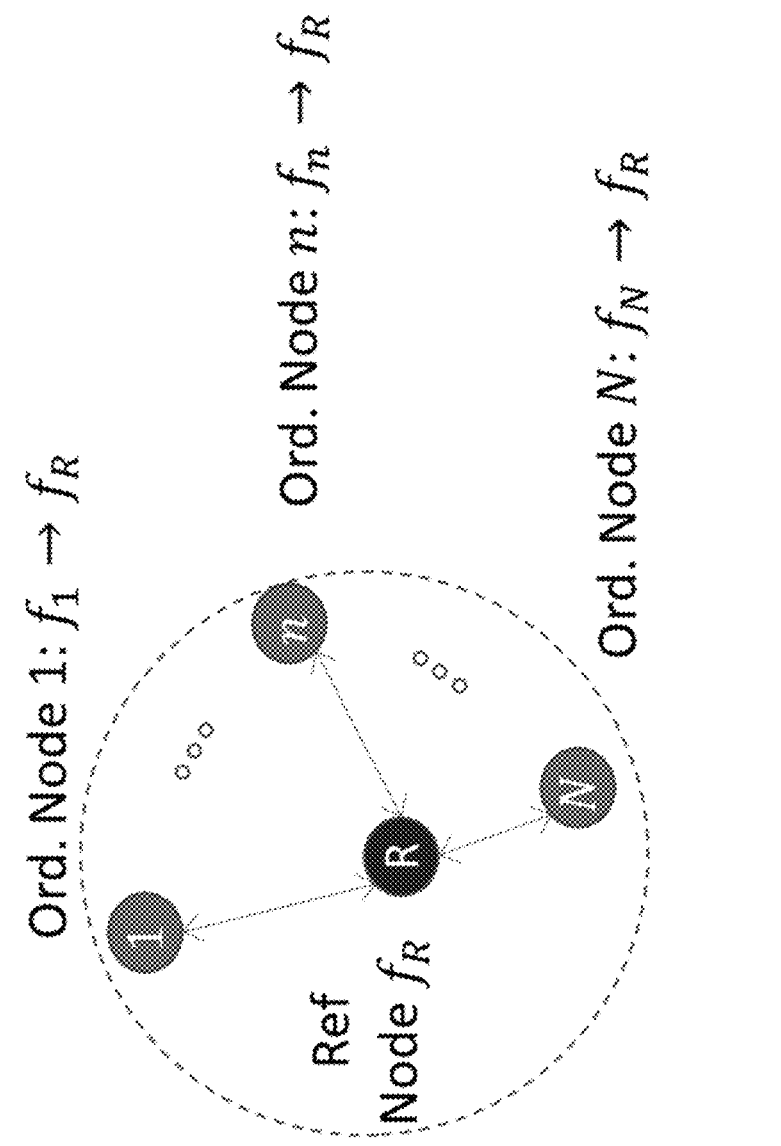
FIG. 6 shows an example of frequency offset correction based on a reference node.

In some embodiments, each Ordinary Node tunes its
carrier frequency to that of the Reference Node whose
carrier frequency serves as a reference and is not adjusted,
as shown in FIG. 6, where each Ordinary Node tunes its
carrier frequency (denoted $f_1, \ldots f_n, \ldots f_N$) to $f_R$, which is
the carrier frequency of the Reference Node.

The frequency offset $\hat{f}_{FO} = f_R - f_n$ between the frequency of
the probe $f_R$ received from the Reference Node by the
Ordinary Node in the Respond Calibration sub-slot and the
frequency of the Ord Node $f_n$ can be estimated. In an
example, the frequency offset can be estimated by estimating
the rate of phase rotation in the received probe demodulated
to baseband at the Ordinary Node n. This is followed by
applying the estimate $\hat{f}_{FO}$ when the Ordinary Node n trans-
mits probes to the Reference Node.

Figure 7:
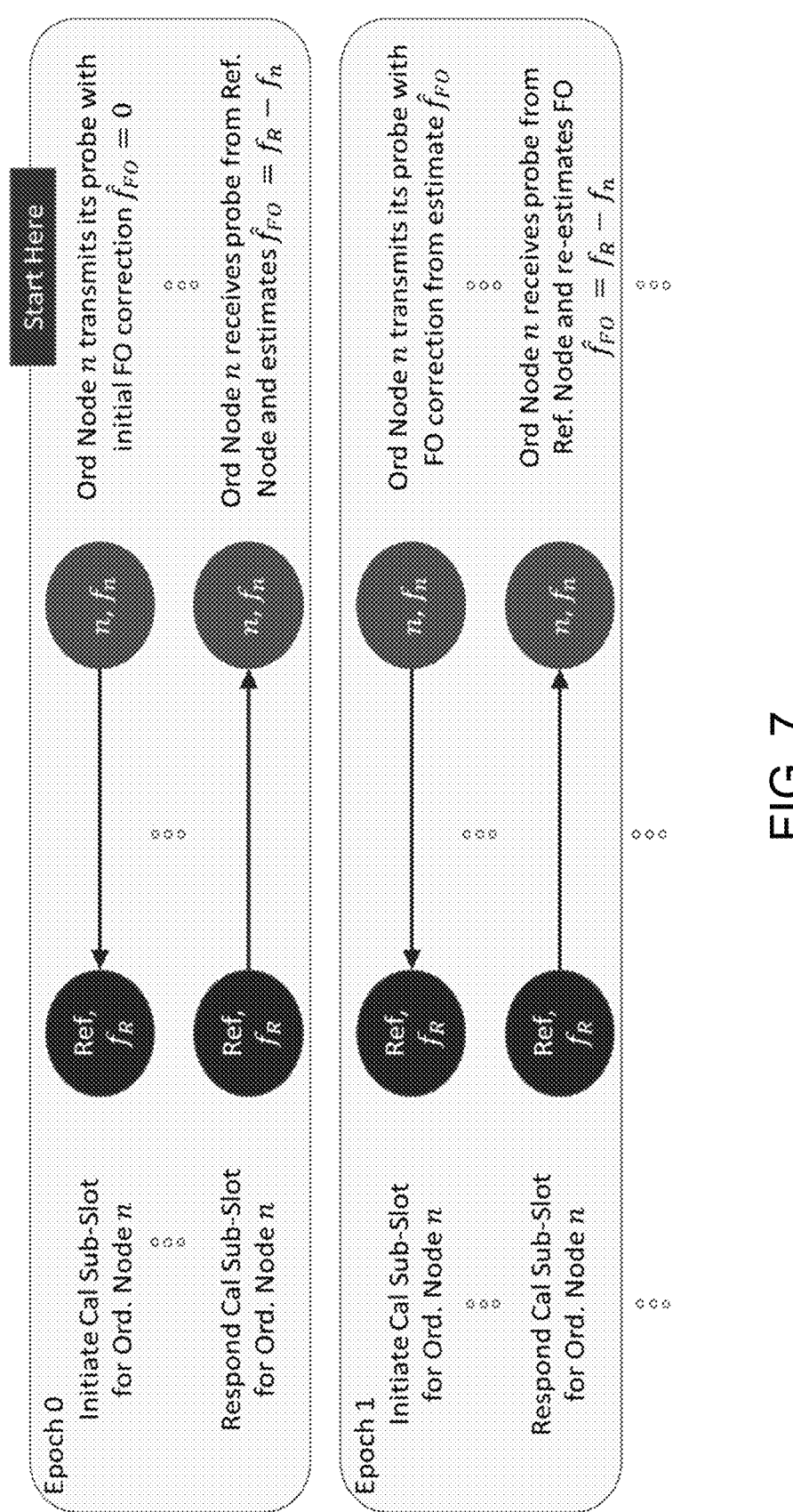
FIG. 7 shows an example of estimating the frequency offset.

This approach is further detailed in FIG. 7, which shows
an example of estimating the frequency offset over multiple
epochs. As shown therein, the frequency offset (FO) correction $\hat{f}_{FO}$ term will be initialized zero. In Epoch 0, there is no
FO correction in the initial Calibration Slot when Ordinary
Node n∈[1, N] transmits to the Reference Node during the
Initiate Calibration sub-slot. Further in this epoch, Ordinary
Node n estimates the FO when it receives a probe from the
Reference Node during the Respond Calibration sub-slot. In
some embodiments, the estimate can utilize estimates from
previous epochs. For example, by averaging across
$N_{FOestimtes}$ of the latest estimates (using a moving average,
weighted moving average, etc.). In Epoch 1, Ordinary Node
n transmits with an FO correction using the estimate made
most recently. In an example, the FO correction can be
applied as a phase rotation to the baseband probe to be
transmitted by Ordinary Node n. Subsequent epochs will
repeat the operations described for Epoch 0 and Epoch 1.

4. Examples of Delay Estimation and Transmit Time Adjustment

Figure 8:
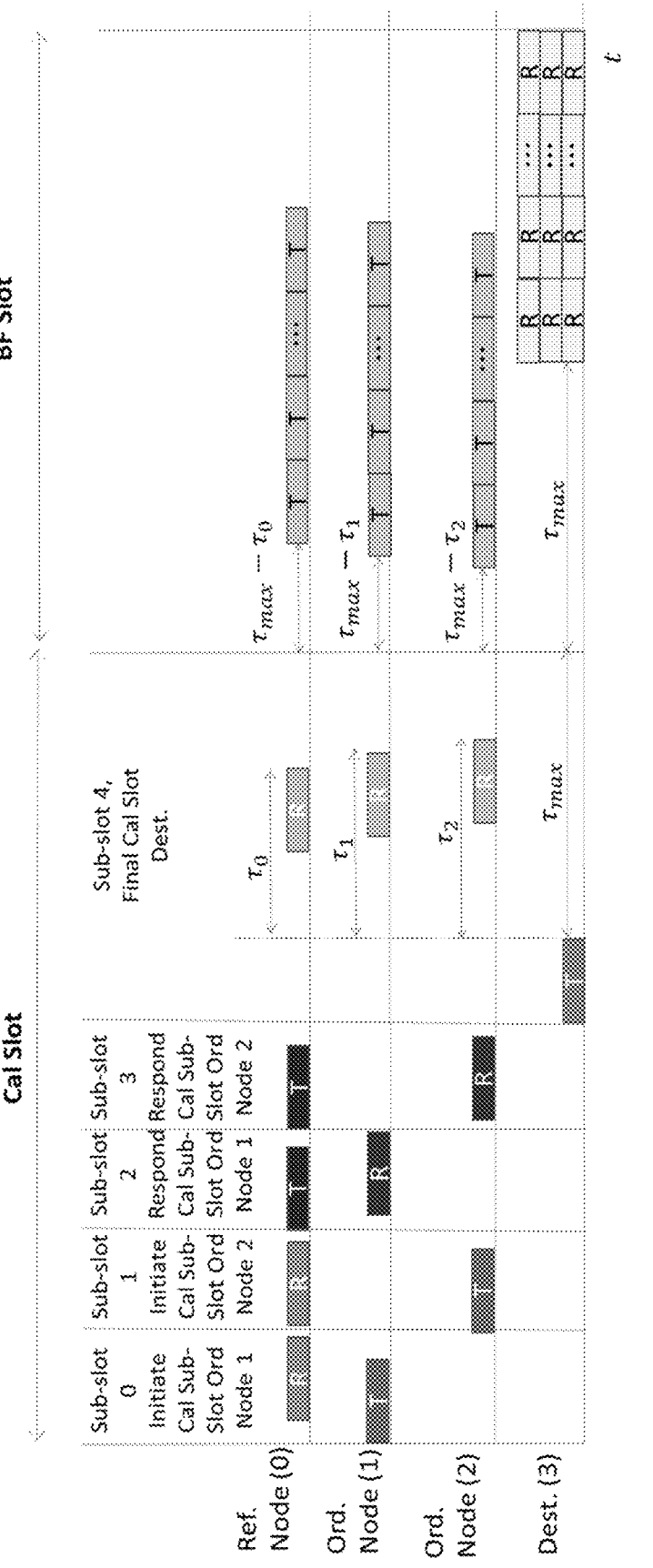
FIG. 8 shows an example of delay estimation and transmit time adjustment.

In some embodiments, delay estimation and transmit time
adjustment can be used to ensure that the waveforms trans-
mitted by each Ordinary Node arrive at the Destination
Node at the same time. FIG. 8 shows an example of delay
estimation and transmit time adjustment for the case of N=2
Ordinary Nodes, and which can be extended to multiple
Ordinary Nodes. In this embodiment, each Ordinary Node is
assumed to have knowledge of (a) a maximum supported
delay $\tau_{max}$ and (b) the start time of the Final Calibration
sub-slot. The latter, for example, may be obtained through a
Global Positioning System (GPS) clock or a network timing
reference.

As shown in FIG. 8, each Ordinary Node measures the
propagation delay of the probe transmitted by the Destina-
tion Node in the Final Calibration sub-slot. In the Beam-
forming Slot, each Ordinary Node delays its waveform
transmission by $\tau_{max}$ minus the estimated propagation delay.
For example, the Ordinary Node closest to the Destination
would delay its waveform transmission the most, whereas
the Ordinary Node furthest from the Destination Node
would delay its waveform transmission the least.

5. Examples of Transmit (Tx) Phase Calibration for DBF

Implementing Tx phase calibration leads to a DBF Tx
phase shaping term that each Ordinary Node (and Reference
Node) applies in the Beamforming Slot to ensure that each
of their waveforms arrive at the Destination Node (or more
generally, at the destination cluster) phase aligned. Embodi-
ments of the disclosed technology provide methods to
perform transmit phase calibration in two cases: (1) when
the transmit (Tx) phase and receive (Rx) phase at a node is
identical, and (2) when the Tx Phase and Rx Phase at a node
differ.

As referred to herein, the "transmit (Tx) phase" and the
"receive (RX) phase" of a node correspond to the phase of
the local oscillator of the node (e.g., of the transceiver of the
node) when transmitting a signal and receiving a signal,
respectively.

Phase Calibration when the Tx Phase and Rx Phase are
Identical

In these embodiments, it is assumed frequency synchro-
nization has been achieved between all the nodes, and that
the Tx phase and Rx phase at a node are identical. Further-
more, the Reference Node is also denoted as "0" indicating
the 0th node.

FIG. 9 shows an example of transmit phase calibration for DBF when the Tx phase and Rx phase are identical. As shown therein, the following operations are performed in each of the Calibration sub-slots and Beamforming slot:

In the Initiate Calibration sub-slot, Ordinary Node n transmits a probe with its Tx phase $\phi_n$ to the Reference Node, and the Reference Node measures the Rx phase of the probe $A_n$.

In the Respond Calibration sub-slot, the Reference Node transmits a probe back to Ordinary Node n with a modified Tx phase: its Tx phase $\phi_0$ minus $A_n$, and Ordinary Node n measures the Rx phase of the probe $B_n$.

In the Final Calibration sub-slot, the Destination Node transmits a probe with a modified Tx phase set to its Tx phase $\phi_D$, and Ordinary Node n measures the Rx phase of the probe $C_n$. In embodiments where Ordinary Nodes and the Reference Node are beamforming to a destination cluster, the Destination Node that transmits the probe may be selected from the nodes in the destination cluster based on position location information (PLI) or information from GPS signals. In an example, the node selected is located closest to a center of mass of the destination cluster. In another example, the node selected is located closest to the source cluster.

In the Beamforming Slot, Ordinary Node n transmits the waveform to the Destination Node with a modified Tx phase: $[\phi_n + B_n - C_n]$. Herein, $B_n - C_n$ is the phase shaping or phase correction term for Ordinary Node n, and the Destination Node receives the waveform with a Rx phase of $2(\phi_0 - \phi_D)$, which is independent of n.

It is noted that the Destination Node receiving a waveform with a Rx phase that is independent of a phase term that depends on the Ordinary Node that transmitted the waveform is what enables the waveforms from Ordinary Nodes $n \in [1, N]$ to sum constructively.

Furthermore, the measured Rx phase is the sum of three terms: the Tx phase, the channel delay induced phase and the negative of the Rx phase.

As described above, the Tx phase at a node can be either the Tx phase (e.g., the Destination Node in the Final Calibration sub-slot with Tx phase $\phi_D$) or a modified version of it. The modified version may be the sum of the Tx phase and one phase shaping term (e.g., the Reference Node in the Respond Calibration sub-slot with modified Tx phase $[\phi_0 - A_n]$) or the sum of the Tx phase and two phase shaping terms (e.g., the Ordinary Node in the Beamforming Slot with modified phase $[\phi_n + B_n - C_n]$).

Phase Calibration when the Tx Phase and Rx Phase Differ

Figure 10A:
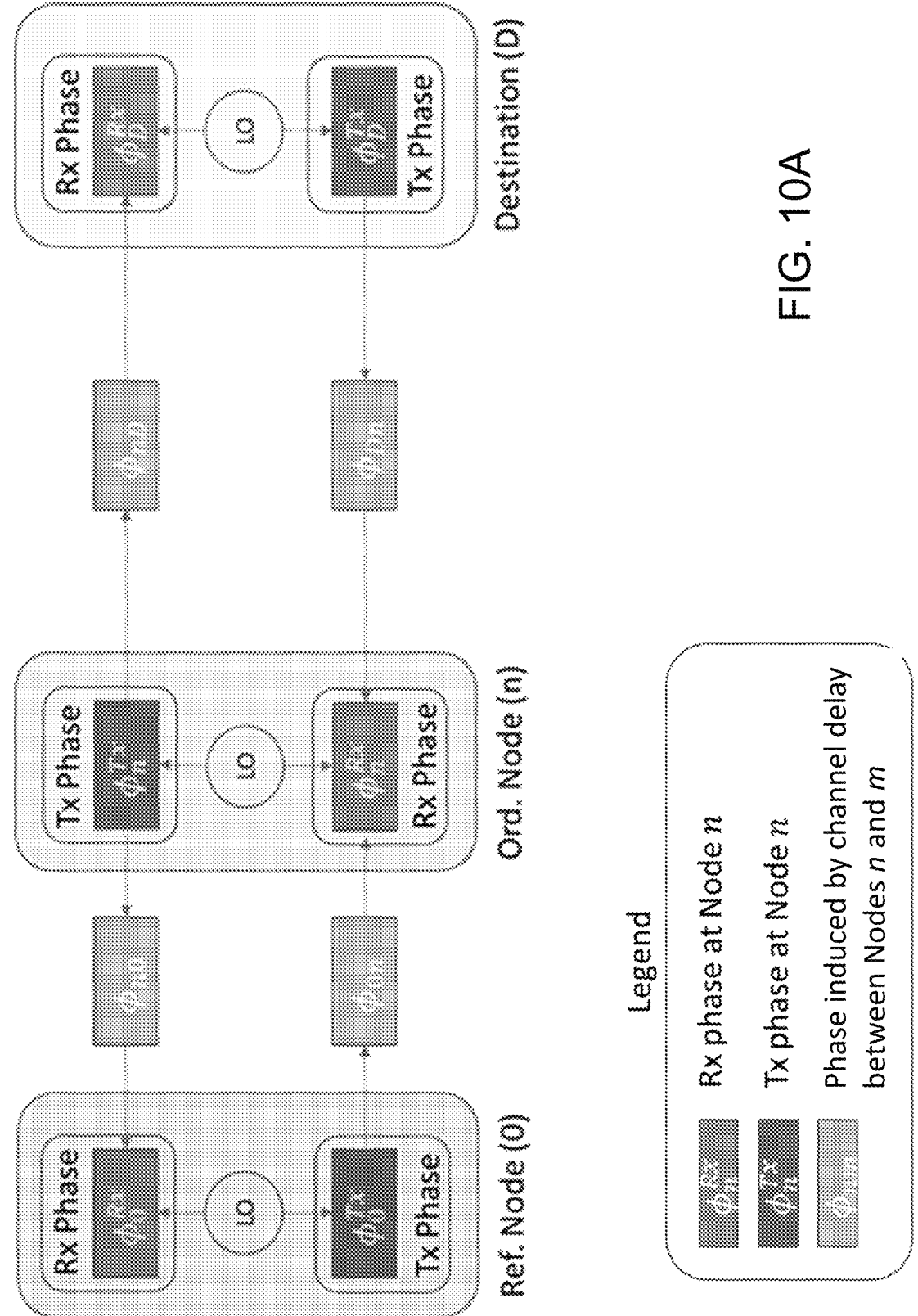

FIGS. 10A and 10B show another example of transmit phase calibration for DBF, in the more general case, when the Tx phase and Rx phase differ. FIG. 10A shows phases assumed in this example, and FIG. 10B shows the operations for transmit phase calibration, which include operations that are similar to those described in FIG. 9, and which will not be separately described in the context of this example.

In this scenario, $B_n - C_n$ is the phase shaping or phase correction term for Ordinary Node n where $B_n$ is obtained at the end of the Respond Calibration sub-slot and $C_n$ is obtained at the end of the Final Calibration sub-slot. It is noted, as in the previous scenario, that Destination Node receives the waveform from Ordinary Node n with a receive phase that is independent of the phase associated with Ordinary Node n (in spite of the distinct Tx and Rx phases). Thus, the waveforms received from each Ordinary Node $n \in [1, N]$ can be received at the same phase and hence, phase-aligned, at the Destination Node.

6. Examples of Correction of FO-Induced Phase Rotations

In the absence of FO where the carrier frequency of Ordinary Node n is identical to that of the Reference Node, the phase offset $\phi_n(t) = \phi_n$ is fixed with time. However, in the presence of FO where the carrier frequency of Ordinary Node n differs from that of the Reference Node, the phase offset $\phi_n(t)$ can change with time due to the FO. For example, if FO=100 Hz, this translates to one hundred (100) 360-degree rotations in one second, or equivalently, a 360-degree rotation in 10 msec and a 36-degree rotation in 1 msec. This phase rotation, if left unchecked, can significantly impair OL-DBF performance.

Figure 11A:
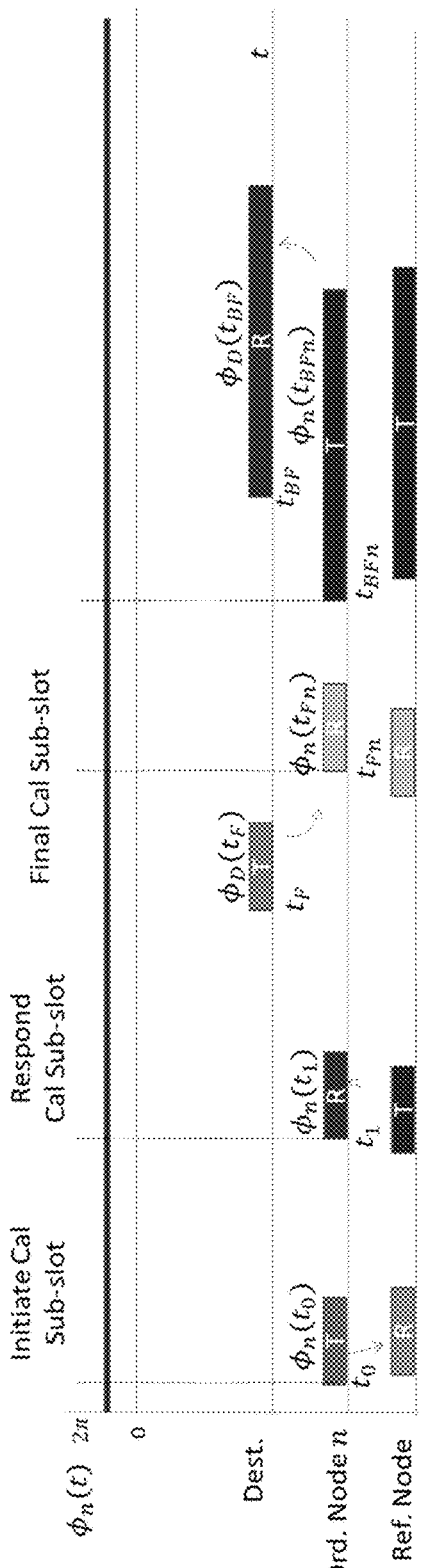
FIGS. 11A and 11B show an example of the correction of phase rotations induced by a frequency offset.
Figure 11B:
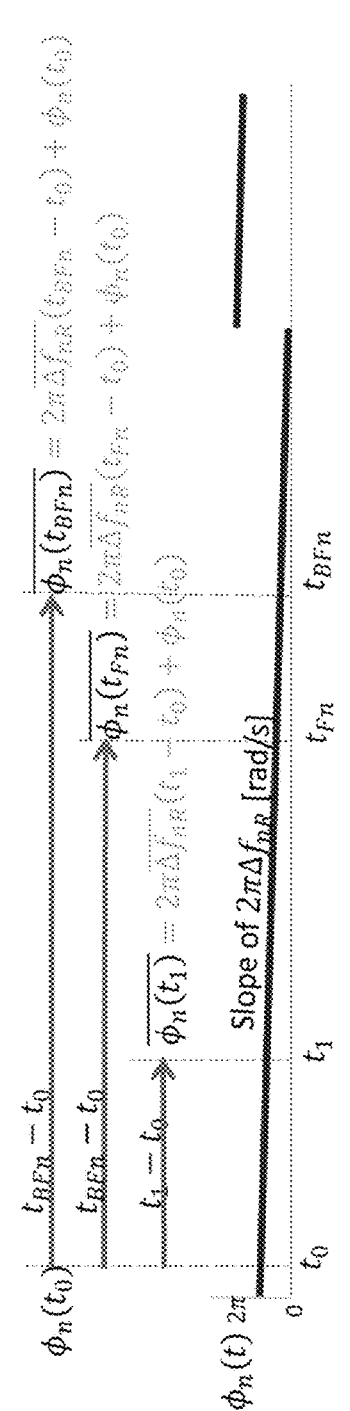

Embodiments of the disclosed technology provide methods to correct this type of FO-induced phase rotations, which are shown in the examples in FIGS. 11A and 11B. As shown therein, the phase correction terms are computed as a product of (1) the time separation between the time of estimation to an initial time (to when Ordinary Node n initiates Initiate Calibration sub-slot) and the subsequent phase estimate times ($t_1$ start of the Respond Calibration sub-slot, $t_{Fn}$ start of the Final Calibration sub-slot and $t_{BF}$ the start of the Beamforming Slot), and (2) the FO (converted to radians/sec or degrees/sec). The phase of Ordinary Node n is corrected at the time instants shown by adding the phase correction terms to estimate $\phi_n(t)$.

7. Examples of Open-Loop Distributed MIMO

The disclosed embodiments can be used to generate a useable channel matrix from open-loop channel sounding probes for distributed nodes. Herein, the antennas are not co-located, the phases for each node differ in general. The case of a cluster A with N nodes transmitting to a cluster B with M nodes where each node is outfitted with an omni-directional antenna is considered. Furthermore, the channel between node $n \in [1, N]$ in Cluster A and node $m \in [1, M]$ in Cluster B is examined, and it is assumed Tx and Rx phases are equal at a node that supports perfect carrier and timing synchronization. In some embodiments, the latter assumption of equal Tx and Rx phase at a node may not hold.

In some embodiments, the channel matrix in the direction of Cluster A to Cluster B in distributed MIMO consists of three parts:

(1) The phase $\phi_n^A$ of node n in cluster A where $n \in [1, N]$;

(2) The phase $\phi_m^B$ of node m in cluster B where $m \in [1, M]$;

(3) The channel propagation delay induced phase in the direction of Cluster A to Cluster B, which is given by $\phi_{mn}^{BA} = -2\pi f_c \tau_{mn}$ where $f_c$ and $\tau_{mn}$ represent, respectively, a common carrier frequency of all nodes in the system and the propagation delay between nodes n and m. With channel reciprocity, $\tau_{mn} = \tau_{nm}$ and $\phi_{mn}^{BA} = \phi_{nm}^{AB} = \phi_{mn}^{ch}$.

Furthermore, the channel pathloss is $a_{mn}^{BA}$ in the direction of A to B. With channel reciprocity, $a_{mn}^{BA} = a_{nm}^{AB} = a_{mn}$, which is real-valued.

In general, each channel induced phase is a function of the carrier frequency of the node. Assuming intra-cluster frequency synchronization, each node in a cluster is assumed to have converged to a common carrier frequency for that cluster. As noted later, the common frequency in Cluster A may differ from that in Cluster B. It is also assumed that the Tx phase on $\phi_n^{A,Tx}$ and Rx phase $\phi_n^{A,Rx}$ at each node are equal such that $\phi_n^{A,Tx} = \phi_n^{A,Rx} = \phi_n^A$. In general, however, they may differ. It is also assumed that there is no noise.

Given the above three components, we can express the (m, n)th element in the A→B channel matrix $H_{M,N}^{BA}$ for closed-loop (CL) distributed MIMO as:

$$h_{mn}^{BA} = a_{mn}e^{j(\phi_n^A + \phi_{mn}^{ch} - \phi_m^B)} \tag{1}$$

Herein, the (n, m)-th element in the B→A channel matrix $H_{N,M}^{AB}$ for open-loop (OL) distributed MIMO is given as:

$$h_{nm}^{AB} = a_{mn}e^{j(-\phi_n^A + \phi_{mn}^{ch} + \phi_m^B)} \tag{2}$$

$$\text{and } h_{nm}^{AB*} = a_{mn}e^{j(\phi_n^A - \phi_{mn}^{ch} - \phi_m^B)} \tag{3}$$

In the above, $h_{nm}^{AB*} \ne h_{mn}^{BA}$. The polarity of the phases associated with each node (not the channel delay induced phase) differ, which implies that the OL channel matrix differs from the CL channel matrix. Consequently, using the OL channel matrix as is in place of the CL channel matrix would not yield the desired SVD solution.

In some embodiments, the OL channel matrix can be used by transforming it to the CL matrix or a matrix with a similar form. This may be achieved by applying the conjugate of the double phase difference $e^{j2(\phi_0^A - \phi_n^A)}$, $e^{-j2(\phi_0^A - \phi_n^A)}$, to Eqn. (2), where do represents the phase of a reference node, which results in version 1 of the channel element:

$$h_{nm}^{AB,v1} = a_{mn}e^{-j2(\phi_0^A - \phi_n^A)}e^{j(-\phi_n^A + \phi_{mn}^{ch} + \phi_m^B)} \tag{4}$$

$$h_{nm}^{AB,v1} = a_{mn}e^{j(-2\phi_0^A + \phi_n^A + \phi_{mn}^{ch} - \phi_m^B)} \tag{5}$$

Herein, there is a common phase term $\phi_n^A$ with the same polarity in both the OL and CL terms, but the polarity of $\phi_m^B$ differs. To this end, the double phase difference $e^{j2(\phi_0^B - \phi_m^B)}$ is applied such that Cluster B also performs the in-cluster calibrations with a Reference Node (0) with a phase of $\phi_0^B$. It is noted that the double phase difference (DPD) is applied when node m in Cluster B transmits the OL sounding probe to Cluster A since this DPD is unavailable at the nodes in Cluster A. This results in the OL channel matrix element becoming:

$$h_{nm}^{AB,v2} = a_{mn}e^{j2(\phi_0^B - \phi_n^B)}e^{j(-\phi_n^A + \phi_{mn}^{ch} + \phi_m^B)} \tag{6}$$

$$h_{nm}^{AB,v2} = a_{mn}e^{j(-\phi_n^A + \phi_{mn}^{ch} + 2\phi_0^B - \phi_m^B)} \tag{7}$$

Herein, the common phase term $\phi_m^B$ has the same polarity in both the OL and CL terms. The above two versions can be combined to yield:

$$h_{nm}^{AB,v3} = e^{j2(\phi_0^B - \phi_0^A)}h_{mn}^{BA}. \tag{8}$$

Thus, through OL channel sounding, node n can obtain the CL channel matrix element $h_{mn}^{BA}$ scaled by a common phasor $e^{j2(\phi_0^B - \phi_0^A)}$ that is independent of n or m as summarized in Table 1, and which is achieved by incorporating the two steps summarized in Table 2 into the OL channel sounding process.

TABLE 1

Channel matrix elements for CL, OL and a modified OL scheme where $n \in [1, N]$ and $m \in [1, M]$

| Channel | Channel between Node n and m | Comments |
| --- | --- | --- |
| A → B | $h_{mn}^{BA} = a_{mn}e^{j(\phi_n^A + \phi_{mn}^{BA} - \phi_m^B)}$ | CL Channel matrix element |
| B → A | $h_{nm}^{AB} = a_{mn}e^{j(\phi_n^{-A} + \phi_{mn}^{BA} + \phi_m^B)}$ | OL Channel matrix element |
| B → A, v3 | $e^{j2(\phi_0^B - \phi_0^A)}h_{mn}^{BA}$ | Modified OL Channel matrix element which matches the CL Channel matrix but with a complex constant scaling factor $e^{j2(\phi_0^B - \phi_0^A)}$ |

TABLE 2

Steps to obtain the channel matrix elements where $n \in [1, N]$ and $m \in [1, M]$

| Step # | Action |
| --- | --- |
| B → A | Apply the DPD $e^{j2(\phi_0^B - \phi_m^B)}$ to the channel sounding probe transmitted by Node m in Cluster B |
| A → B | Apply the conjugate of the DPD $e^{j2(\phi_0^A - \phi_n^A)}$, $e^{-j2(\phi_0^A - \phi_n^A)}$, to the receive phase measured at node n in Cluster A. |

The disclosed embodiments also provide methods for distributed MIMO in which information flows in both directions from A to B and from B to A.

In some embodiments, the following two approaches can be used to perform channel matrix estimation for both directions independently.

(1) Sending channel sounding probes that cross paths where both perform CL sounding or OL sounding. Herein, the two sets of CL or OL sounding feedback are sent back and cross paths as well.

(2) Sending channel sounding probes in the same direction where one is for CL sounding and the other for OL sounding. Herein, one set of CL sounding feedback and one set of OL sounding feedback are sent back in the same direction.

Figure 12:
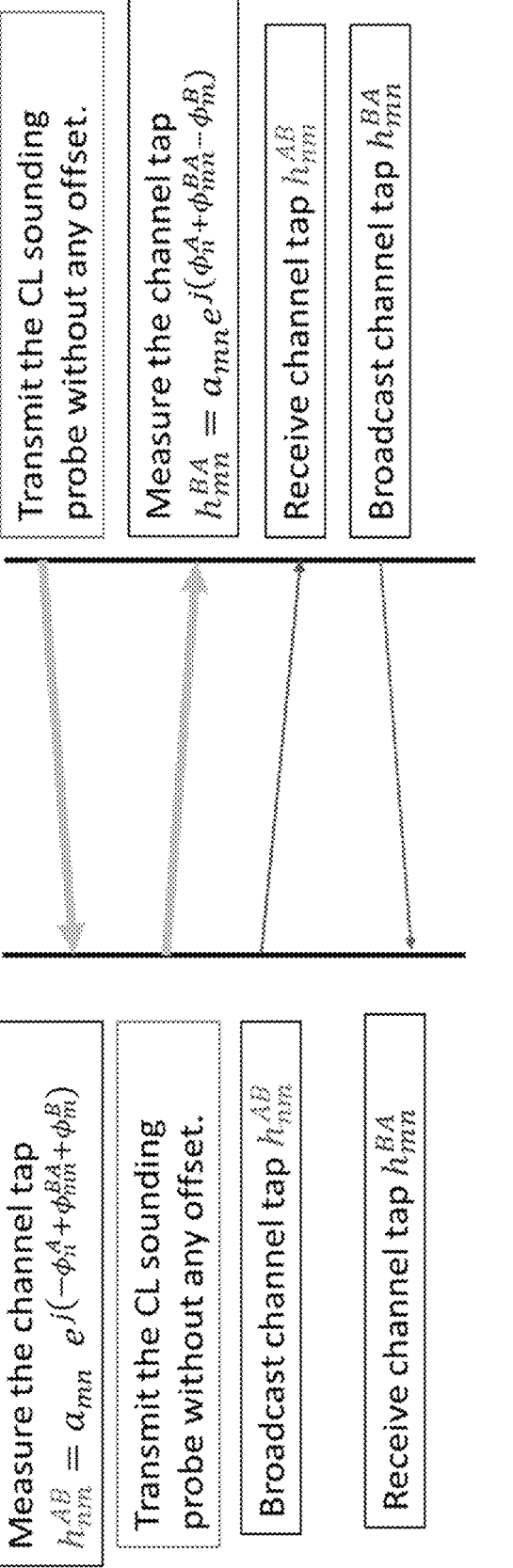
FIG. 12 shows an example of channel estimation based on two parallel sets of closed-loop (CL) probes and feedback signals.
Figure 13:
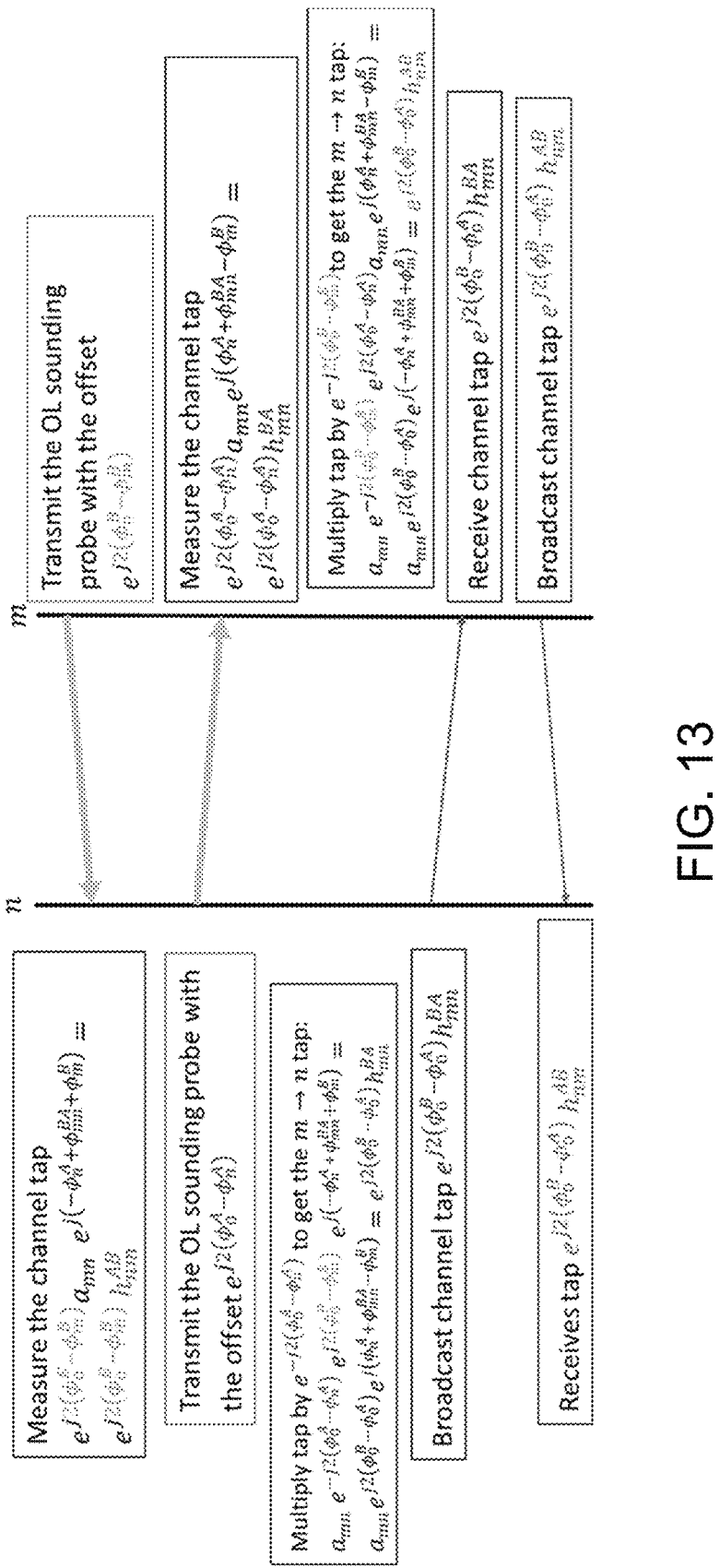
FIG. 13 shows an example of channel estimation based on two parallel sets of open-loop (OL) probes and feedback signals.

These approaches are summarized in Table 3 and in FIGS. 12 and 13.

TABLE 3

Approaches to estimate the channel matrix elements with two independent sets of probes and feedback channels

| | Information Flow A → B | Information Flow B → A |
| --- | --- | --- |
| CL (both directions) | Each node in A sends a probe to nodes in B which in turn send each channel matrix element back to each node in A and to other nodes in B. | Each node in B sends a probe to nodes in A which send each channel matrix element back to each node in B and to other nodes in A. |

TABLE 3-continued

|  | Approaches to estimate the channel matrix elements with two independent sets of probes and feedback channels | |
|  | Information Flow A → B | Information Flow B → A |
|---|---|---|
| Modified OL (v3) (both directions) | Each node in B sends a probe with its DPDs to nodes in A which in turn send each channel matrix element (modified with its DPD) back to each node in B and to other nodes in A. | Each node in A sends a probe with its DPDs to nodes in B which in turn send each channel matrix element (modified with its DPD) back to each node in B and to other nodes in A. |
| CL and Modified OL (v3) in the same direction 1 | Each node in A sends a probe to nodes in B which in turn send each channel matrix element back to each node in A and to other nodes in B. | Each node in A sends a probe with its DPDs to nodes in B which in turn send each channel matrix element (modified with its DPD) back to each node in B and to other nodes in A. |
| CL and Modified OL (v3) in the same direction 2 | Each node in B sends a probe with its DPDs to nodes in A which in turn send each channel matrix element (modified with its DPD) back to each node in B and to other nodes in A. | Each node in B sends a probe to nodes in A which send each channel matrix element back to each node in B and to other nodes in A. |

Figure 14:
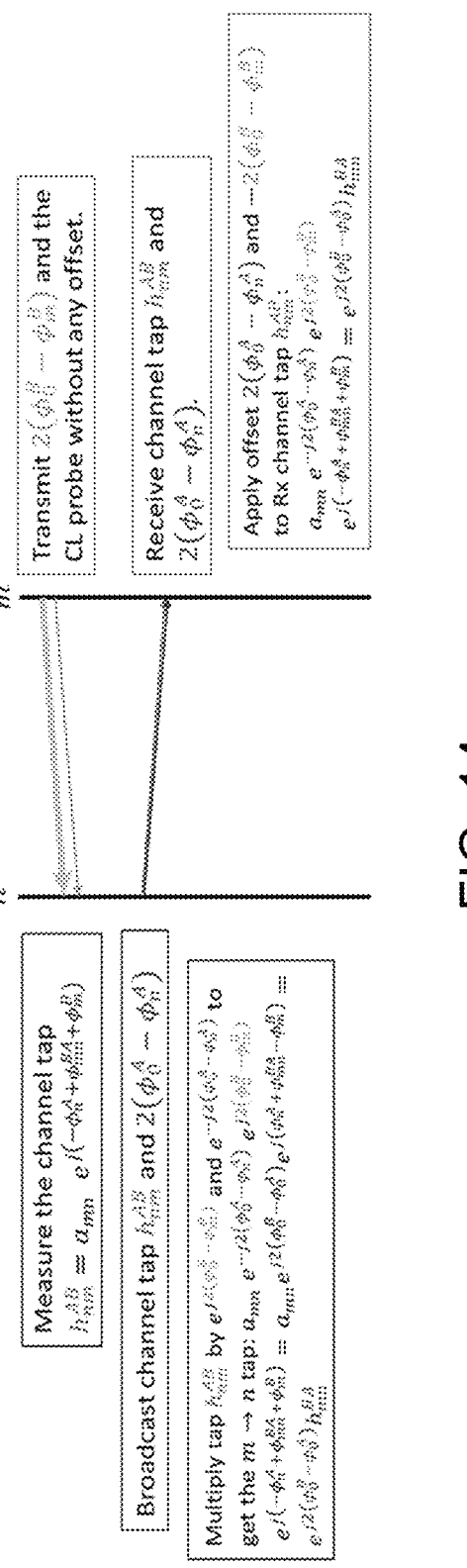
FIG. 14 shows an example of channel estimation based on only one closed-loop (CL) probe and two feedback signals.
Figure 15:
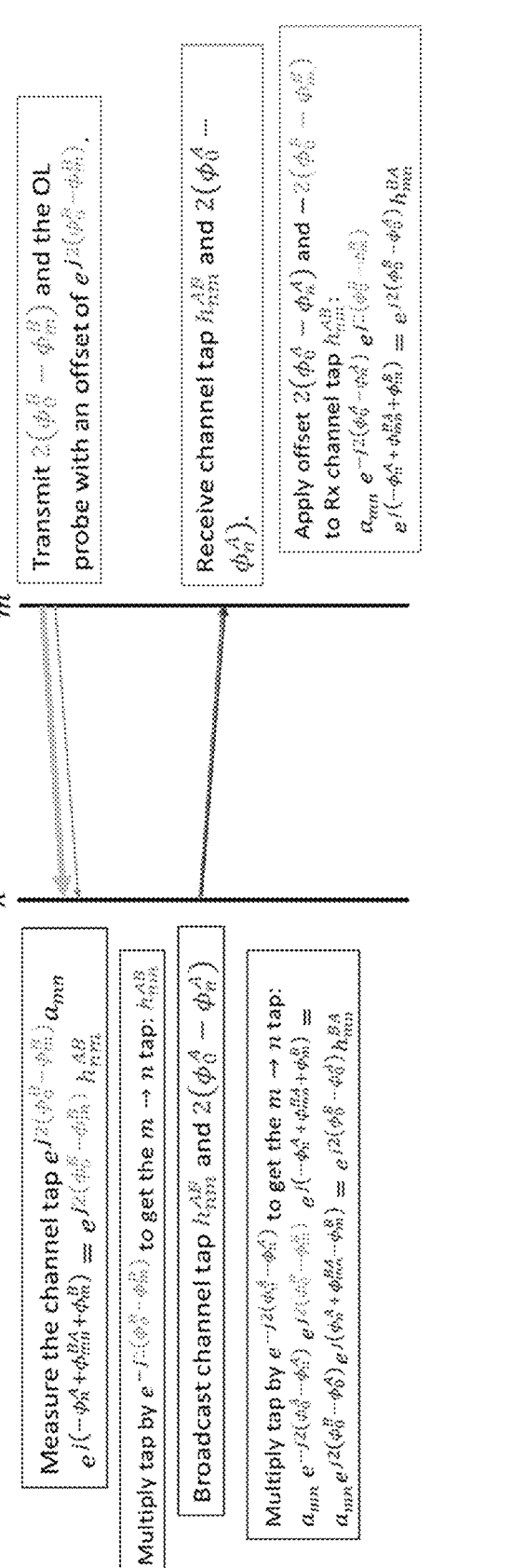
FIG. 15 shows an example of channel estimation based on only one open-loop (OL) probe and two feedback signals.

In some embodiments, a single set of probes can be used for time division duplex (TDD) systems, as shown in FIGS. 14 and 15. As shown therein, the single probe is used as a CL probe in one direction and as a OL probe in the other direction. To implement this, both sides (nodes n and m) need to have both DPDs which implies that these need to be shared. The only signaling overhead is the return transmission of a channel tap.

8. Examples of Distributed Collaborative Beamforming

In some embodiments, a distributed collaborative beamforming approach is described from a set of spatially-distributed radio network nodes $N_i$; i=1, 2, . . . , K, towards a remote collaborating radio destination node D. In some embodiments, a method for distributed collaborative beamforming in a network comprising multiple network nodes (or nodes, or radios) comprises four stages.

Stage 1. Each network node gets possession of a common message sent by a source S, which is the message to be beam-formed towards the destination D. Stage 1 of the distributed collaborative beamforming approach is operationally equivalent to the Data Sharing Slot of the OL-DBF approach shown in FIG. 2.

Stage 2. The network nodes self-cohere via a sequence of bidirectional signal exchanges (or a combination of signal and message exchanges), performed between chosen pairs of nodes. This results in all nodes in the network having been included in the self-coherence process and having derived and stored a phase correction value. Stage 2 of the distributed collaborative beamforming approach is operationally equivalent to the Initiate Calibration and Respond Calibration sub-slots of the OL-DBF approach shown in FIG. 2.

Stage 3. Each network node receives a broadcast probe signal from the destination node D. Based on this probe, each network node estimates a complex-valued, multipath-fading baseband channel model, identifies the strongest tap in the channel model, and computes the phase (argument) of the strongest complex-valued tap. In some embodiments, all the network nodes receive the probe from the destination at roughly the same time (e.g., within a timeslot, or within adjacent timeslots). Stage 3 of the distributed collaborative beamforming approach is operationally equivalent to the Final Calibration sub-slot of the OL-DBF approach shown in FIG. 2.

Stage 4. Each network node quasi-synchronously (e.g., within a pre-defined turn-around time upon destination-probe reception) transmits the common message with a total correction phase added to the phase (argument) of the complex baseband values representing the information stream (of the common message). The total correction phase is equal to the negative of the sum of the node's phase correction value (as derived in Stage 2) and the phase (argument) of the strongest complex-valued tap (as estimated in Stage 3). Stage 4 of the distributed collaborative beamforming approach is operationally equivalent to the Beamforming Slot of the OL-DBF approach shown in FIG. 2.

In some embodiments, and for constant-envelope modulated signals, baseband phase correction can be implemented simply by an index shift into the look-up table that generates the information carrying digital phase sequence, thereby maintaining the constant envelope property for the transmitted signal.

In some embodiments, a network node may perform the four stages in an order different from that described above, as long as Stage 4 (which includes the actual beamforming operation) is performed last. For example, the network node may first receive a probe from the destination and compute the phase of the strongest tap of the channel estimation (Stage 3), then receive the common message (Stage 1), followed by participating in the self-coherence process with the other network nodes to derive its phase correction value (Stage 2), and finally perform the beamforming operation (Stage 4). For another example, the network node may first participate in the self-coherence process with the other network nodes to derive its phase correction value (Stage 2), then receive a probe from the destination and compute the phase of the strongest tap of the channel estimation (Stage 3), followed by receiving the common message (Stage 1), and finally perform the beamforming operation (Stage 4).

In some embodiments, the four-stage process described above produces a composite (co-transmitted, superimposed) signal at the destination node which has a larger signal-to-noise ratio (SNR) than what would have been received had the nodes co-transmitted in a phase-incoherent manner, thereby producing a distributed beamforming gain.

FIGS. 16A-16D shows the four stages of an example embodiment for distributed collaborative beamforming, in accordance with the disclosed technology.

Figure 16B:
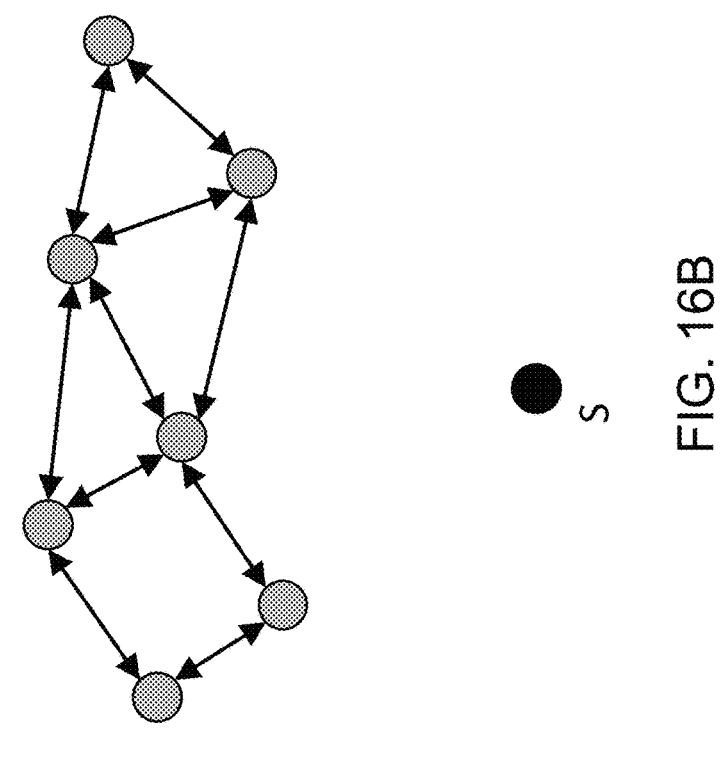
FIGS. 16A-16D shows the stages of an example embodiment for distributed collaborative beamforming, in accordance with the disclosed technology.
Figure 16A:
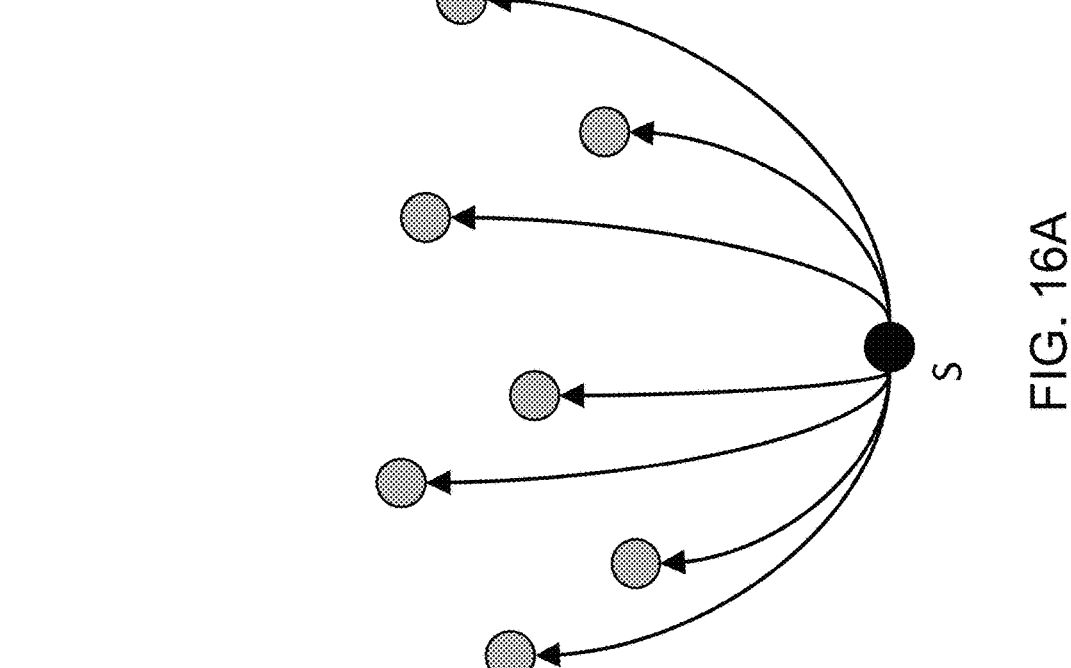

FIG. 16A shows an example of the first message-sharing stage, wherein the K network nodes (shaded grey) get possession of a common message from a source (S). In some embodiments, the message can be distributed via broadcast transmission by one of the network nodes (which also acts as the source in this first stage). In other embodiments, it may be broadcast by a source outside the network of K nodes (e.g., a drone or a satellite broadcasting this common message to a terrestrial network so that this network may further relay the message to D, otherwise unreachable by the source). In yet other embodiments, it may be shared via a backbone-type network (e.g., a high-speed optical network) distinct from the radio network.

FIG. 16B shows an example of the second self-coherence stage. In some embodiments, the purpose of the self-coherence process is to produce the matrix $\Delta\varnothing = \{\delta\varnothing_{ij}\}$; $i \neq j$; $i, j = 1, 2, \ldots, K$, where $\delta\varnothing_{ij} = 2(\partial_i - \partial_j)$, where $\partial_i$ is the phase of the free-running, carrier-producing oscillator of radio node $N_i$. By definition, $\delta\varnothing_{ii} = 0$ for any i. In an example, and as shown in FIG. 16B, this is achieved through a sequence of bi-directional probe-signal exchanges (or signal and message exchanges) between pairs of nodes (i, j).

Once the matrix $\Delta\varnothing$ has been computed fully, a selection process identifies a proper column with desirable characteristics. The column is indexed by the so-called reference node $N_r$, e.g., the column $[\delta\varnothing_{1r}, \delta\varnothing_{2r}, \ldots, \delta\varnothing_{Kr}]$ is computed and stored at each node. The values $\delta\varnothing_{ir}$, $i = 1, 2, \ldots, K$, comprise the set of required correction phases that are used in the beamforming stage (Stage 4).

In some embodiments, the matrix $\Delta\varnothing$ is computed by electing a priori a reference node, and computing only the reference column $[\delta\varnothing_{1r}, \delta\varnothing_{2r}, \ldots, \delta\varnothing_{Kr}]$.

In other embodiments, the matrix $\Delta\varnothing$ is computed by performing a round-robin computation, starting from a chosen start node and proceeding sequentially, whereby each node i in the sequence selects its paired node j on the basis of the highest SNR from all links connected to it, the same is repeated by j, provided that the next selected pair node has not already been already covered before, and so on, until all nodes are exhausted. In another example, other link metrics (e.g., the highest signal-to-interference-plus-noise ratio (SINR)) may be used to select the next paired node.

In yet other embodiments, some entries of the matrix $\Delta\varnothing$ may be determined via the use of the identities $2\Delta\theta_{ij} = -2\Delta\theta_{ji}$ and $2\Delta\theta_{ij} = 2\Delta\theta_{ik} + 2\Delta\theta_{kj}$ (the latter named the "triangle identity"). Alternatively, all entries in $\Delta\varnothing$ are computed using the said identities plus an estimate of the quality (error variance) of the estimated value $\delta\varnothing_{ij}$.

For the computation of the matrix $\Delta\varnothing$ in the embodiments described above, neither a fully-connected network (e.g., radio nodes in multiple hops may participate) nor a static network (e.g., dynamic phase tracking may be included in the computation) is required. In some embodiments, the value $\delta\varnothing_{ij}$ can be computed in one of two ways: either via pure bidirectional exchanges of signals or via a mixture of signal exchanges and message exchanges.

Bidirectional signal exchanges. In some embodiments, a pure bidirectional exchange between nodes $N_i$ and $N_j$ includes the node $N_i$ first emitting a signal, e.g., a probe akin to a tone, i.e. $s_i^{pb}(t) = \cos(2\pi f_c t + \partial_i)$.

In complex-envelope notation, the tone $s_i^{pb}(t) = \mathrm{Re}\{e^{j\partial_i} e^{j2\pi f_c t}\}$ and the complex envelope is $\tilde{s}_i^{pb}(t) = e^{j\partial_i}$. A transmission induces a positive phase shift of $\partial_i$ to the transmitted carrier $\cos(2\pi f_c t)$. Correspondingly, the receiver of node $N_j$ mixes the incoming signal with $\cos(2\pi f_c t + \partial_j)$, and thus any reception equivalently subtracts the local phase $\partial_j$. Neglecting the channel gain scaling, the intervening narrowband channel multiplies with the phasor $e^{j\partial_{i \to j}^{ch}}$, therein adding the random-variable phase of $\partial_{i \to j}^{ch}$, and the total phase at the receiver node $N_j$ is $\theta_{i \to j}^{total} = \partial_i + \partial_{i \to j}^{ch} - \partial_j$.

In this example of a purely bi-directional exchange, node $N_j$ produces, at baseband, the negative of the total phase $-\theta_{i \to j}^{total} = -\partial_i - \partial_{i \to j}^{ch} + \partial_j$ (referred to as "conjugation" or "phase reversal"). Upon up-conversion (which adds the phase $\partial_j$), propagation through the reciprocal channel (which adds the phase $\partial_{i \to j}^{ch}$ and thus cancels the term $-\partial_{i \to j}^{ch}$) and down-conversion at node $N_i$ (which subtracts the phase $\partial_i$), the total phase at the radio baseband of node $N_i$ is $\theta_{i \to j}^{total} = (-\partial_i - \partial_{i \to j}^{ch} + \partial_j) + \partial_j + \partial_{i \to j}^{ch} - \partial_i = 2(\partial_j - \partial_i) = -\delta\varnothing_{ij}$.

In some embodiments, node $N_j$ can be informed of this value through the messaging protocol. In other embodiments, node $N_j$ can initiate its own bidirectional exchange with node $N_j$ in order to compute $\delta\varnothing_{ji}$.

Although, in principle, $\delta\varnothing_{ji} = -\delta\varnothing_{ij}$, in practice, such estimates may be noisy. In some embodiments, the network protocol may allow for message exchanges between nodes, and a better estimate of $\delta\varnothing_{ij}$ can be made by both nodes by averaging the individual estimates.

Message and signal exchanges. In some embodiments, a mixture of signal and message exchanges includes the node $N_i$ initiates the emission of a probe, as before, and node $N_j$ computes $\theta_{i \to j}^{total} = \partial_i + \partial_{i \to j}^{ch} - \partial_j$, as described above. In this embodiment, Node $N_j$ sends, to node $N_i$, an information-carrying message containing this computed value of $\theta_{i \to j}^{total}$. Contemporaneously with this message, node $N_j$ emits a probe signal, so that node $N_i$ can in turn compute the phase $\theta_{j \to i}^{total} = \partial_j + \partial_{j \to i}^{ch} - \partial_i$. Under the assumption of channel reciprocity, $\partial_{i \to j}^{ch} = \partial_{j \to i}^{ch}$. Thus, node $N_i$ possesses knowledge of $\theta_{i \to j}^{total}$ as well as $\theta_{j \to i}^{total}$ and can easily infer that $\theta_{i \to j}^{total} = \theta_{j \to i}^{total} - \theta_{i \to j}^{total} = -\delta\varnothing_{ij}$.

In some embodiments, and as described in the context of bidirectional signal exchanges, the nodes can repeat that process by now starting from $N_j$, or can share the estimated value of $\delta\varnothing_{ij}$ via messaging.

Figures 16C, 16D:
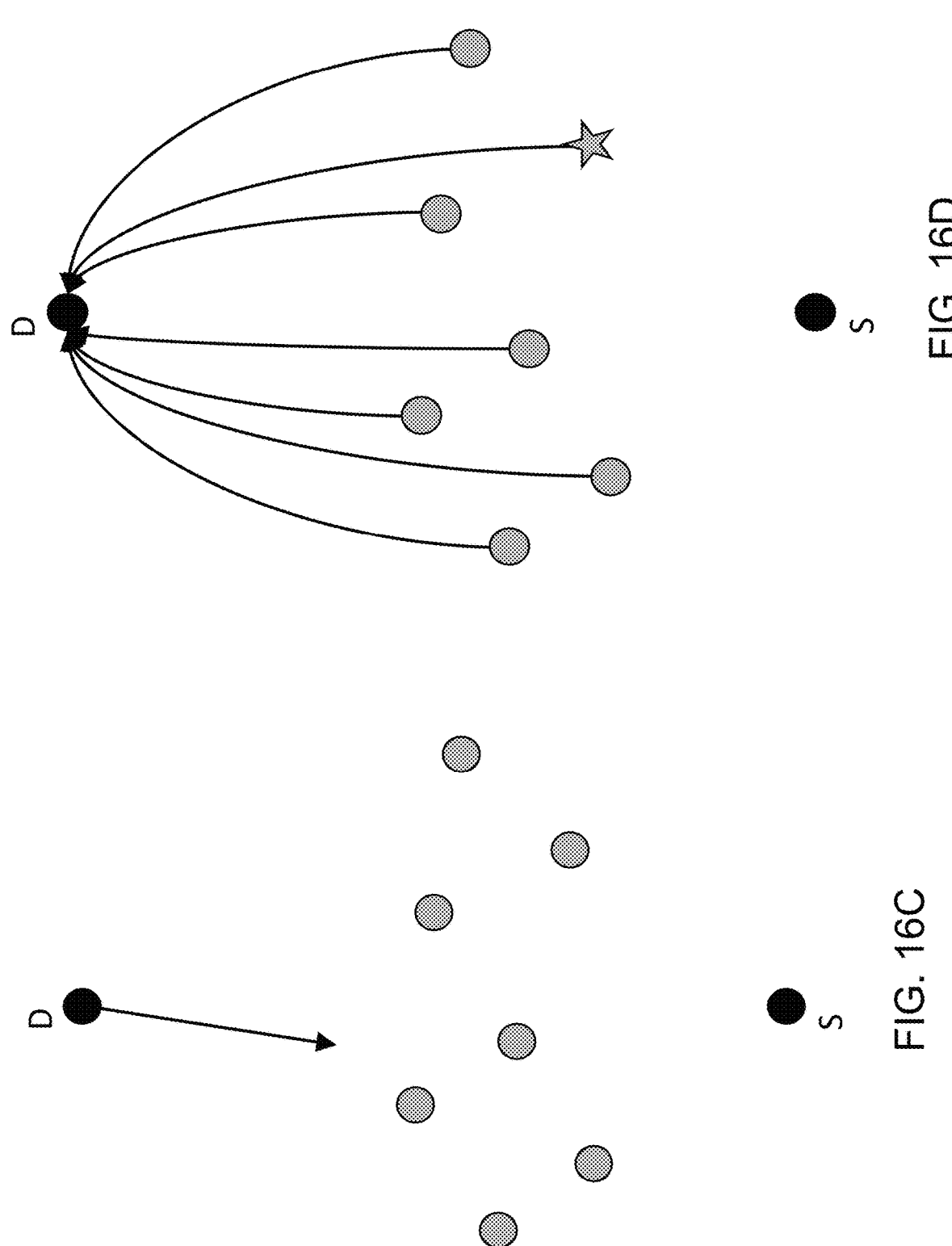

FIG. 16C shows an example of the third per-node phase estimation stage. In some embodiments, the destination node (I)) broadcasts a probe, and each of the network nodes computes a tap-spaced, complex-valued baseband channel model in response to receiving the probe from the destination node. At each node, the magnitudes of the estimated taps are compared and the largest is selected, and then used to compute an argument (phase) estimate $\partial_i^{str\_tap}$ for each node $i = 1, 2, \ldots, K$.

FIG. 16D shows an example of the fourth destination beamforming stage. In some embodiments, the transmission from node $N_i$ is performed with a total correction phase given by $\partial_i^{total\_corr} = -\partial_i^{str\_tap} - \delta\varnothing_{ir}$.

In some embodiments, the distributed collaborative beamforming process described in the context of FIGS. 16A-16D results in the destination node D receiving a multitude of taps. The taps arriving at D include (i) those that have been subjected to the processing of Stage 3 and have been subsequently transmitted with the proper phase $\partial_i^{total\_corr}$ from each node $N_i$, and (ii) all the remaining taps which have not been processed as per Stage 3 (namely, all taps except the selected strongest). All selected and processed taps contributing to the superimposed (co-transmitted) baseband channel model at the destination node D are in principle phase-aligned, with a common complex-baseband argument (phase) equal to $\delta\varnothing_{rD}$, thus producing a coherent beamforming gain modulo $\delta\varnothing_{rD}$. The remaining non-selected and non-processed channel taps coming from all nodes and contributing to the superimposed channel at D act as non-coherent taps and do not provide beamforming gain, although they provide noncoherent power gains.

Additional Example Embodiments of the Presently Disclosed Technology

In some embodiments, all the network nodes are fully connected. The selection of a reference node, which completes Stage 2 with all nodes individually, may be performed in a sequence of its choice, since all nodes are within hearing range of the reference node. The choice of the reference node may pertain to the best average link SNR (averaged over all other nodes). More generally, any function (e.g., average, median, maximum, etc.) of a link-quality metric (e.g., SNR, SINR, etc.) may be used in the determination of the choice of the network node. It is further assumed, in this embodiment, that link-quality information is available to all nodes which share it and update it regularly.

In some embodiments, the reference node may have good access to some but not all the nodes of the network due to some low-quality links. The reference node may identify such impaired-link nodes and request, via proper messages, the help of neighboring nodes (e.g., send a request that they perform bidirectional exchanges with the impaired-link nodes in more favorable link conditions and thus assist in completing the full reference column via the said identities).

In some embodiments, there may be information on the nature of links (e.g., line-of-sight (LoS) or non-LoS (NLoS)), which may be used to determine which links are to be used by each node in its own bidirectional exchanges (e.g., only the LOS links may be used), in the process of filling out the phase matrix.

In some embodiments, an initial node may be chosen either at random, or via a quality metric (e.g., best link SNR among nodes), and is referred to as "node 1". Node 1 completes 8012 with a second node ("node 2"), which may be the node within hearing range of node 1 with the highest link SNR of all links out of node 1. The pair (1,2) is announced via a short message, so that all nodes in the network know which pairs have been covered. Then node 2 completes 8023 with a subsequent node ("node 3"), chosen in a similar manner as before, and the pair is announced, and so on. The process ends when all nodes within hearing range (e.g., one-hop nodes) have been completed. If there are nodes within hearing range in some portion of the network (e.g., in a network of at least 2 hops), then a node from the second hop requests participation to the self-coherence process. The node(s) which hear it extend the process to that node, which then completes the process for those in the second-hop hearing range, and the process repeats until all hops have been covered. Thus, distributed collaborative beamforming can be applied to multi-hop (and not fully connected) networks, provided that the whole multi-hop network is within range of the probe of destination D for the subsequent stages.

In some embodiments, the estimate of the individual terms $\delta\emptyset_{ij}$ may be accompanied by a quality metric, signifying the confidence of the estimating node on the quality of the said term (e.g., an estimated error variance). The various quality metrics may be distributed in message exchanges and used subsequently to refine estimates either via the use of identities (such as the triangle identity) when completing the matrix $\Delta\emptyset$, namely by incorporating weighting terms in the computation, or in refining final estimates of reciprocal links ((i→j) and (j→i)), assuming that the protocol allows computation of both. The final quality metrics for all relevant phase-difference qualities may be used for selecting the reference node, e.g., as the one whose column possesses the highest average quality metric. Links for which the quality of the estimate $\delta\emptyset_{ij}$ is deemed unacceptable (too noisy) may discard the estimate and another sequence of nodes in the computation process may be selected.

In some embodiments, individual links may be subjected to significant interference (e.g., due to jamming). The elements of the matrix corresponding to such corrupted links may be eliminated from the bidirectional signal exchange (phase measurement) process. Instead, the said elements may be filled in via other measurements in related uncorrupted links and the use of the aforementioned identities (e.g., the triangle identity).

In some embodiments, the network nodes may use separate oscillator phases for the transmit and receive nodes.

In some embodiments, the terms $\delta\emptyset_{ij}$ are computed not just by bidirectional signal exchanges between nodes but by a mixture of signal exchanges as well as message exchanges, whereby the messages convey the (quantized) value of the estimated baseband phase of the radio that has received a signal and has computed such a phase. The final estimate of $\delta\emptyset_{ij}$ is computed by proper combination of the signal phases as well as the massage-conveyed phase values.

In some embodiments, the terms $\delta\emptyset_{ij}$ are estimated via parameter-tracking methods which account for mobility and phase-noise impairments. Such phase-tracking methods can also be used to fill in (e.g., by prediction) estimated values in case the process is interrupted for a short period of time. In an example, these tracking methods can also be used to reduce the frequency for bidirectional exchanges, thus lowering the network overhead traffic necessary to support the embodiments described in the present document.

In some embodiments, a variety of methods in may be employed in choosing the strongest channel tap for computing the respective phase. In an example, the strongest channel tap is the direct largest gain value among taps. In another example, a complex channel tap is computed via interpolation methods between taps estimated using the observation samples (measurements) of the channel-estimation process.

9. Example Methods and Implementations of the Disclosed Technology

FIG. 17 shows a flowchart of an example of a method 1700 for collaborative wireless communication. The method 1700 includes, at operation 1710, performing a bidirectional communication with a reference node in the source cluster.

The method 1700 includes, at operation 1720, receiving, from a destination cluster comprising a second plurality of nodes, a probe generated using a phase associated with the destination cluster.

The method 1700 includes, at operation 1730, estimating, based on a propagation delay of the probe, a delay parameter.

The method 1700 includes, at operation 1740, generating, based on the phase associated with the destination cluster and the delay parameter, a channel estimate.

The method 1700 includes, at operation 1750, transmitting, to each of the second plurality of nodes, a common message generated using a phase value and a delay value that are derived based on the channel estimate, and the destination cluster being remotely located from the source cluster.

In some embodiments, performing the bidirectional communication comprises transmitting, to the reference node, a first probe generated using a transmit phase associated with the first node, and receiving, from the reference node, a second probe generated using a transmit phase associated with the reference node, wherein the phase value is further based on the transmit phases associated with the first node and the reference node (e.g., as shown in the Initiate Calibration and Respond Calibration sub-slots in FIG. 2).

In some embodiments, the transmit phase associated with the first node is periodically corrected to compensate for a frequency offset between the first node and the reference node (e.g., as described in Section 3).

In some embodiments, the bidirectional communication comprises a frequency offset correction corresponding to a frequency offset between the reference node and a respective node of the first plurality of nodes.

In some embodiments, the method 1700 further includes the operation of measuring the propagation delay of the probe received from the destination cluster based on a Global Positioning System (GPS) clock or a network timing reference (e.g., as described in Section 4).

In some embodiments, each of the first plurality of nodes uses a time-domain multiple access (TDMA) medium access control (MAC).

In some embodiments, the TDMA MAC comprises a first timeslot and a second timeslot used for performing the bidirectional communication, a third timeslot used for receiving the probe, and a fourth timeslot used for transmitting the common message.

In some embodiments, a length of the first timeslot is equal to a length of the second timeslot, and a length of the third timeslot is greater than the length of the first timeslot. In other embodiments, the first timeslot precedes the second timeslot. In yet other embodiments, the third timeslot precedes either the first timeslot or the second timeslot.

In some embodiments, the channel estimate comprises a predominant tap with the phase value and the delay value, and the bidirectional communication, the probe, or the common message comprises a constant envelope signal.

In some embodiments, the channel estimate comprises multiple channel taps, and each of the multiple channel taps comprises a channel tap phase and a channel tap delay.

In some embodiments, the probe received from the destination cluster is received from a node that is closest to a center of mass of the second plurality of nodes, and center of mass is determined based on position location information (PLI) or information from a Global Positioning System (GPS) signal.

Embodiments of the disclosed technology provide a system for collaborative wireless communication that includes a first plurality of nodes in a source cluster, a reference node in the source cluster, and a second plurality of nodes in a destination cluster, wherein each of the first plurality of nodes is configured to perform a bidirectional communication with the reference node (e.g., Initiate Calibration and Respond Calibration sub-slots as shown in FIG. 2), receive, from the destination cluster, a probe generated using a phase associated with the destination cluster (e.g., Final Calibration sub-slot as shown in FIG. 2), estimate, based on a propagation delay of the probe, a delay parameter (e.g., as shown in FIG. 8), generate, based on the phase associated with the destination cluster and the delay parameter, a channel estimate (e.g., as shown in FIGS. 12-14), and transmit, to each node of the second plurality of nodes, a common message generated using a phase value and a delay value (e.g., Beamforming Slot as shown in FIG. 2), wherein the phase value and the delay value are derived based on the channel estimate, and wherein the destination cluster is remotely located from the source cluster.

The described embodiments provide, inter alia, the following technical solutions:

1. A system for collaborative wireless communication, comprising a first plurality of nodes in a source cluster, a reference node in the source cluster, and a second plurality of nodes in a destination cluster, wherein each of the first plurality of nodes is configured to perform a bidirectional communication with the reference node, receive, from the destination cluster, a probe generated using a phase associated with the destination cluster, estimate, based on a propagation delay of the probe, a delay parameter, generate, based on the phase associated with the destination cluster and the delay parameter, a channel estimate, and transmit, to each node of the second plurality of nodes, a common message generated using a phase value and a delay value, wherein the phase value and the delay value are derived based on the channel estimate, and wherein the destination cluster is remotely located from the source cluster.

2. The system of solution 1, wherein a first node of the first plurality of nodes is configured, as part of performing the bidirectional communication, to transmit, to the reference node, a first probe generated using a transmit phase associated with the first node, and receive, from the reference node, a second probe generated using a transmit phase associated with the reference node, wherein the phase value is further based on the transmit phases associated with the first node and the reference node.

3. The system of solution 2, wherein the transmit phase associated with the first node is periodically corrected to compensate for a frequency offset between the first node and the reference node.

4. The system of any of solutions 1 to 3, wherein the bidirectional communication comprises a frequency offset correction corresponding to a frequency offset between the reference node and a respective node of the first plurality of nodes.

5. The system of any of solutions 1 to 4, wherein each of the first plurality of nodes is further configured to measure the propagation delay of the probe received from the destination cluster based on a Global Positioning System (GPS) clock or a network timing reference.

6. The system of any of solutions 1 to 5, wherein each of the first plurality of nodes uses a time-domain multiple access (TDMA) medium access control (MAC).

7. The system of solution 6, wherein the TDMA MAC comprises a first timeslot and a second timeslot used for performing the bidirectional communication, a third timeslot used for receiving the probe, and a fourth timeslot used for transmitting the common message.

8. The system of solution 7, wherein a length of the first timeslot is equal to a length of the second timeslot, and wherein a length of the third timeslot is greater than the length of the first timeslot.

9. The system of solution 7, wherein the first timeslot precedes the second timeslot.

10. The system of solution 7, wherein the third timeslot precedes either the first timeslot or the second timeslot.

11. The system of any of solutions 1 to 10, wherein the channel estimate comprises a predominant tap with the phase value and the delay value, and wherein the bidirectional communication, the probe, or the common message comprises a constant envelope signal.

12. The system of any of solutions 1 to 10, wherein the channel estimate comprises multiple channel taps, and wherein each of the multiple channel taps comprises a channel tap phase and a channel tap delay.

13. The system of any of solutions 1 to 12, wherein the probe received from the destination cluster is received from a node that is closest to a center of mass of the second plurality of nodes.

14. The system of solution 13, wherein the center of mass is determined based on position location information (PLI) or information from a Global Positioning System signal.

15. A method for collaborative wireless communication implemented at a first node of a first plurality of nodes in a source cluster, the method comprising performing a bidirectional communication with a reference node in the source cluster, receiving, from a destination cluster comprising a second plurality of nodes, a probe generated using a phase associated with the destination cluster, estimating, based on a propagation delay of the probe, a delay parameter, generating, based on the phase associated with the destination cluster and the delay parameter, a channel estimate, and transmitting, to each of the second plurality of nodes, a common message generated using a phase value and a delay value, wherein the phase value and the delay value are derived based on the channel estimate, and wherein the destination cluster is remotely located from the source cluster.

16. The method of solution 15, wherein the performing the bidirectional communication includes transmitting a first probe generated using a transmit phase associated with the first node, and receiving a second probe generated using a transmit phase associated with the reference node, wherein the phase value is further based on the transmit phases associated with the first node and the reference node.

17. The method of solution 16, wherein the transmit phase associated with the first node is periodically corrected to compensate for a frequency offset between the first node and the reference node.

18. The method of solution 15, wherein the bidirectional communication comprises a frequency offset correction corresponding to a frequency offset between the reference node and a respective node of the first plurality of nodes.

19. The method of any of solutions 15 to 18, further comprising measuring the propagation delay of the probe received from the destination cluster based on a Global Positioning System (GPS) clock or a network timing reference.

20. The method of any of solutions 15 to 19, wherein each of the first plurality of nodes uses a time-domain multiple access (TDMA) medium access control (MAC).

21. The method of solution 20, wherein the TDMA MAC comprises a first timeslot and a second timeslot used for performing the bidirectional communication, a third timeslot used for receiving the probe, and a fourth timeslot used for transmitting the common message.

22. The method of solution 21, wherein a length of the first timeslot is equal to a length of the second timeslot, and wherein a length of the third timeslot is greater than the length of the first timeslot.

23. The method of solution 21, wherein the first timeslot precedes the second timeslot.

24. The method of solution 21, wherein the third timeslot precedes either the first timeslot or the second timeslot.

25. The method of any of solutions 15 to 24, wherein the channel estimate comprises a predominant tap with the phase value and the delay value, and wherein the bidirectional communication, the probe, or the common message comprises a constant envelope signal.

26. The method of any of solutions 15 to 24, wherein the channel estimate comprises multiple channel taps, and wherein each of the multiple channel taps comprises a channel tap phase and a channel tap delay.

27. The method of any of solutions 15 to 26, wherein the probe received from the destination cluster is received from a node that is closest to a center of mass of the second plurality of nodes.

28. The method of solution 27, wherein the center of mass is determined based on position location information (PLI) or information from a Global Positioning System signal.

29. A wireless communication apparatus comprising a processor and a transceiver, wherein the processor is configured to perform a method recited in any one of solutions 15 to 28.

30. A non-transitory computer-readable storage medium comprising instructions which, when executed by a data processing apparatus, cause the data processing apparatus to perform a method recited in any one of solutions 15 to 28.

Figure 18:
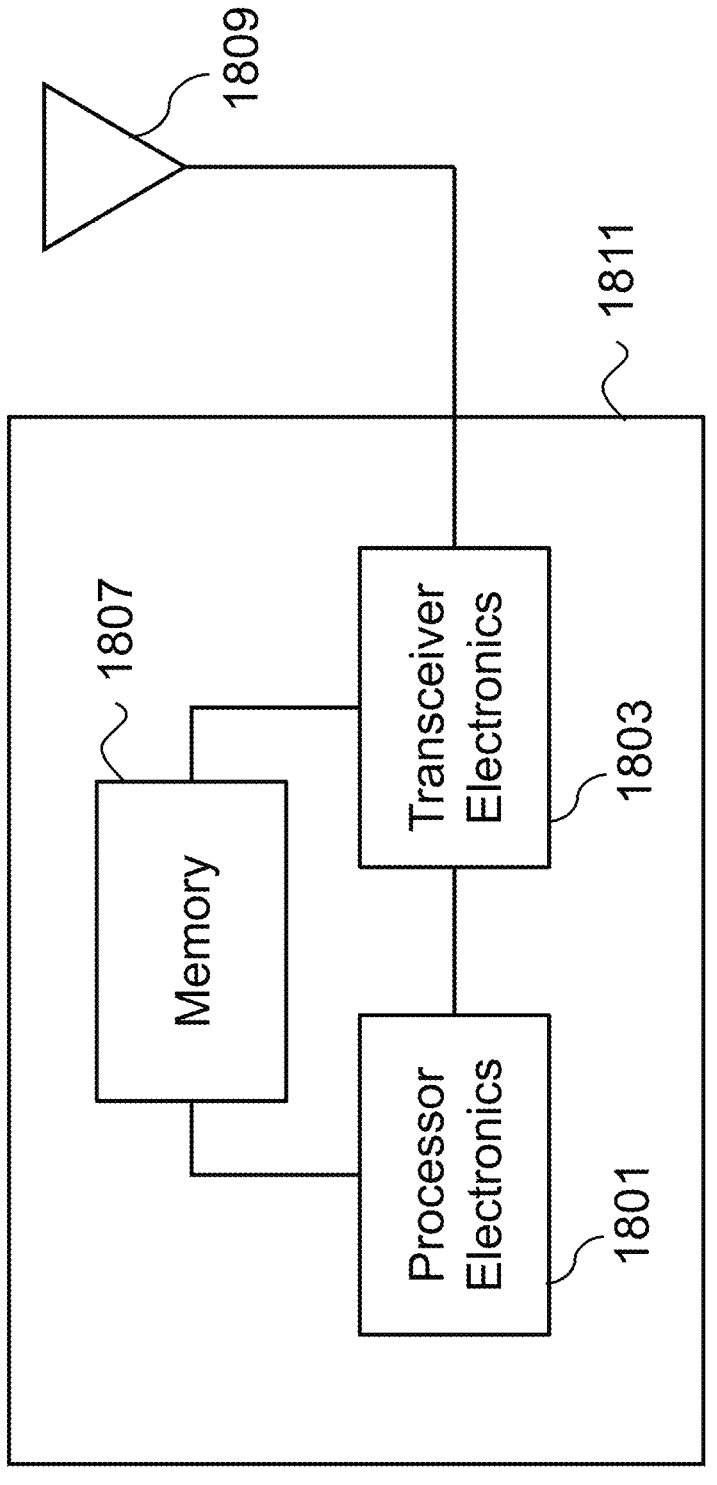
FIG. 18 is a block diagram representation of a portion of a radio that may be used to implement embodiments of the disclosed technology.

FIG. 18 is a block diagram representation of a portion of a radio, in accordance with some embodiments of the presently disclosed technology. A radio 1811 can include processor electronics 1801 such as a microprocessor that implements one or more of the techniques presented in this document. The radio 1811 can include transceiver electronics 1803 to send and/or receive wireless signals over one or more communication interfaces such as antenna(s) 1809. The radio 1811 can include other communication interfaces for transmitting and receiving data. Radio 1811 can include one or more memories 1807 configured to store information such as data and/or instructions. In some implementations, the processor electronics 1801 can include at least a portion of the transceiver electronics 1803. In some embodiments, at least some of the disclosed techniques, modules or functions (including, but not limited to, method 1700) are implemented using the radio 1811.

It is intended that the specification, together with the drawings, be considered exemplary only, where exemplary means an example and, unless otherwise stated, does not imply an ideal or a preferred embodiment. As used herein, "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this disclosure.

What is claimed is:

1. A system for collaborative wireless communication, comprising:
   a first plurality of nodes in a source cluster;
   a reference node in the source cluster; and
   a second plurality of nodes in a destination cluster,
   wherein each of the first plurality of nodes is configured to:
      perform a bidirectional communication with the reference node,
      receive, from the destination cluster, a probe generated using a phase associated with the destination cluster, estimate, based on a propagation delay of the probe, a delay parameter,
   generate, based on the phase associated with the destination cluster and the delay parameter, a channel estimate, and
   transmit, to each node of the second plurality of nodes, a common message generated using a phase value and a delay value, wherein the phase value and the delay value are derived based on the channel estimate, and
   wherein the destination cluster is remotely located from the source cluster.

2. The system of claim 1, wherein a first node of the first plurality of nodes is configured, as part of performing the bidirectional communication, to:
   transmit, to the reference node, a first probe generated using a transmit phase associated with the first node; and
   receive, from the reference node, a second probe generated using a transmit phase associated with the reference node,
   wherein the phase value is further based on the transmit phases associated with the first node and the reference node.

3. The system of claim 2, wherein the transmit phase associated with the first node is periodically corrected to compensate for a frequency offset between the first node and the reference node.

4. The system of claim 1, wherein the bidirectional communication comprises a frequency offset correction corresponding to a frequency offset between the reference node and a respective node of the first plurality of nodes.

5. The system of claim 1, wherein each of the first plurality of nodes is further configured to:
   measure the propagation delay of the probe received from the destination cluster based on a Global Positioning System (GPS) clock or a network timing reference.

6. The system of claim 1, wherein each of the first plurality of nodes uses a time-domain multiple access (TDMA) medium access control (MAC).

7. The system of claim 6, wherein the TDMA MAC comprises a first timeslot and a second timeslot used for performing the bidirectional communication, a third timeslot used for receiving the probe, and a fourth timeslot used for transmitting the common message.

8. The system of claim 7, wherein a length of the first timeslot is equal to a length of the second timeslot, and wherein a length of the third timeslot is greater than the length of the first timeslot.

9. The system of claim 7, wherein the first timeslot precedes the second timeslot.

10. The system of claim 7, wherein the third timeslot precedes either the first timeslot or the second timeslot.

11. The system of claim 1, wherein the channel estimate comprises a predominant tap with the phase value and the delay value, and wherein the bidirectional communication, the probe, or the common message comprises a constant envelope signal.

12. The system of claim 1, wherein the channel estimate comprises multiple channel taps, and wherein each of the multiple channel taps comprises a channel tap phase and a channel tap delay.

13. The system of claim 1, wherein the probe received from the destination cluster is received from a node that is closest to a center of mass of the second plurality of nodes.

14. The system of claim 13, wherein the center of mass is determined based on position location information (PLI) or information from a Global Positioning System (GPS) signal.

15. A method for collaborative wireless communication implemented at a first node of a first plurality of nodes in a source cluster, the method comprising:

performing a bidirectional communication with a reference node in the source cluster;

receiving, from a destination cluster comprising a second plurality of nodes, a probe generated using a phase associated with the destination cluster;

estimating, based on a propagation delay of the probe, a delay parameter;

generating, based on the phase associated with the destination cluster and the delay parameter, a channel estimate; and transmitting, to each of the second plurality of nodes, a common message generated using a phase value and a delay value, wherein the phase value and the delay value are derived based on the channel estimate, and wherein the destination cluster is remotely located from the source cluster.

16. The method of claim 15, wherein the performing the bidirectional communication comprises:

transmitting, to the reference node, a first probe generated using a transmit phase associated with the first node; and receiving, from the reference node, a second probe generated using a transmit phase associated with the reference node, wherein the phase value is further based on the transmit phases associated with the first node and the reference node.

17. The method of claim 16, wherein the transmit phase associated with the first node is periodically corrected to compensate for a frequency offset between the first node and the reference node.

18. The method of claim 15, wherein the bidirectional communication comprises a frequency offset correction corresponding to a frequency offset between the reference node and a respective node of the first plurality of nodes.

19. The method of claim 15, further comprising:

measuring the propagation delay of the probe received from the destination cluster based on a Global Positioning System (GPS) clock or a network timing reference.

20. A wireless communication apparatus comprising a processor and a transceiver, wherein the processor is configured to perform a method comprising:

performing, using the transceiver, a bidirectional communication with a reference node in a source cluster;

receiving, using the transceiver, from a destination cluster comprising a second plurality of nodes, a probe generated using a phase associated with the destination cluster;

estimating, based on a propagation delay of the probe, a delay parameter;

generating, based on the phase associated with the destination cluster and the delay parameter, a channel estimate; and transmitting, using the transceiver, to each of the second plurality of nodes, a common message generated using a phase value and a delay value, wherein the phase value and the delay value are derived based on the channel estimate, and wherein the destination cluster is remotely located from the source cluster.

* * * * *